US008417265B2

(12) United States Patent
Kimishima

(10) Patent No.: US 8,417,265 B2
(45) Date of Patent: Apr. 9, 2013

(54) WIRELESS COMMUNICATION DEVICE WITH NAVIGATION FUNCTIONS FOR ACCURATELY DETECTING ORIENTATION BY A GEOMAGNETISM SENSOR AND DISPLAYING MAPS WITH THE CURRENT ORIENTATION

(75) Inventor: Masato Kimishima, Tokyo (JP)

(73) Assignee: Sony Corporation, Tokyo (JP)

( * ) Notice: Subject to any disclaimer, the term of this patent is extended or adjusted under 35 U.S.C. 154(b) by 241 days.

(21) Appl. No.: 12/852,695

(22) Filed: Aug. 9, 2010

(65) Prior Publication Data

US 2011/0065460 A1 Mar. 17, 2011

(30) Foreign Application Priority Data

Sep. 17, 2009 (JP) ................... 2009-216081

(51) Int. Cl.
*H04W 24/00* (2009.01)
(52) U.S. Cl.
USPC .............. 455/456.6; 455/456.1; 455/457; 455/550.1; 455/556.2; 701/445; 701/491; 701/408; 340/539.1; 340/539.13
(58) Field of Classification Search ....... 455/456.1–457, 455/550.1; 701/400, 208, 408, 449, 472, 701/491, 525, 526, 541; 340/539.1, 539.13
See application file for complete search history.

(56) References Cited

U.S. PATENT DOCUMENTS

| 6,029,111 | A | * | 2/2000 | Croyle | 701/494 |
| 6,636,787 | B2 | * | 10/2003 | Yamaguchi et al. | 701/22 |
| 6,898,521 | B2 | * | 5/2005 | Yanai | 701/414 |
| 7,363,147 | B2 | * | 4/2008 | Esaki et al. | 701/454 |
| 7,941,189 | B2 | * | 5/2011 | Miyauchi | 455/569.2 |
| 8,019,535 | B2 | * | 9/2011 | Endo et al. | 701/450 |
| 2007/0233381 | A1 | * | 10/2007 | Okeya | 701/213 |
| 2009/0320305 | A1 | * | 12/2009 | Ito et al. | 33/356 |

FOREIGN PATENT DOCUMENTS

| JP | 2008076374 | * | 3/2008 |
| JP | 2008-76374 | | 4/2008 |

OTHER PUBLICATIONS

U.S. Appl. No. 12/853,346, filed Aug. 10, 2010, Kimishima.
U.S. Appl. No. 13/396,944, filed Feb. 15, 2012, Kimishima.

* cited by examiner

*Primary Examiner* — Anthony Addy
*Assistant Examiner* — Babar Sarwar
(74) *Attorney, Agent, or Firm* — Oblon, Spivak, McClelland, Maier & Neustadt, L.L.P.

(57) ABSTRACT

A navigation device includes a measuring unit to measure the current position; a geomagnetism sensor that is provided on a predetermined main unit, and is to detect geomagnetism; an orientation calculation unit to calculate the orientation of the main unit, upon setting correction values for correction detection values of the geomagnetism, based on the detection values and the correction values; a presenting unit to present measurement results by the measuring unit and the calculation results of the orientation to a user; an operating state switchover unit to switch between a normal operating state that executes the presenting processing and a suspended state that maintains a portion of processing state while stopping at least the calculation processing of the orientation; and an initialization processing unit to initialize the correction values, in the case of having switched from the suspended state to the normal operating state by the operating state switchover unit.

6 Claims, 15 Drawing Sheets

WIRELESS COMMUNICATION DEVICE WITH NAVIGATION FUNCTIONS FOR ACCURATELY DETECTING ORIENTATION BY A GEOMAGNETISM SENSOR AND DISPLAYING MAPS WITH THE CURRENT ORIENTATION

BACKGROUND OF THE INVENTION

1. Field of the Invention

The present invention relates to a cellular phone having a navigation device, correction value initialization method, and navigation function, and for example can be favorably applied to a navigation device that can detect an azimuth with a geomagnetism sensor.

2. Description of the Related Art

Hitherto, navigation devices have been widely used which are mounted on vehicles or the like that move, calculate the current position based on a GPS (Global Positioning System) signal transmitted from a GPS satellite, and indicate the position of the vehicle and direction for advancing on a map screen.

Also, there are navigation devices called a PND (Personal Navigation Device) which a user can readily carry between a vehicle and a home or the like, or between vehicles, and which can perform map screen displays or the like even when being carried.

Of these PNDs, a PND has been proposed which has a geomagnetism sensor that detects geomagnetism implemented therein, calculates orientation based on the detection results of the detected geomagnetism, and displays a map screen that matches the orientation (e.g., see Japanese Unexamined Patent Application Publication No. 2008-076374).

Besides a PND, portable electronic devices such as cellular phones for example have been proposed which have measuring functions, map display functions and the like, and further have a geomagnetism sensor and display a map screen matching the orientation.

Now, geomagnetism sensors are easily influenced by the magnetic field by a magnetic substance such as metal or the like nearby, and further, even in cases wherein the magnetism in a metallic part such as a shield plate or the like provided within the PND changes, there are cases of influence thereof. Therefore, when starting to compute orientation with a geomagnetism sensor, the PND performs predetermined initialization processing (e.g., correction value adjustments and so forth), whereby the orientation can be appropriate computed based on detection signals obtained from the geomagnetism sensor.

On the other hand, there are PNDs which can shift to a suspended state wherein only a portion of the internal circuits and so forth are operated when a user is temporarily not using and so forth, similar to a general-use computer or the like.

Upon predetermined return operations being performed, a PND that has shifted to a suspended state omits the initialization processing and the like which is performed at time of normal start-up, is restored to the operating state immediately prior to the shift to the suspended state, and can immediately start continuing operations.

However, there are cases wherein, at the time of return operations from the suspended state, the PND has been moved to a location that is different from immediately prior to shifting to the suspended state where surrounding the magnetic field is different, and cases wherein, in the event of being moved in the suspended state, the PND is influenced by the surrounding magnetic field, and magnetism of the internal metallic parts change.

In such cases, there has been the problem that the PND may not correctly detect the orientation by the geomagnetism sensor, and the map screen matching the current orientation may not be correctly displayed.

It has been found desirable to provide a cellular phone having a navigation device that can improve detection accuracy of orientation by a geomagnetism sensor, correction value initialization method, and navigation function.

SUMMARY OF THE INVENTION

With a navigation device and correction value initialization method according to an embodiment of the present invention, the current position is measured by a predetermined measuring unit, geomagnetism is detected by a geomagnetism sensor that is provided on a predetermined main unit, orientation of the main unit is calculated by a predetermined orientation calculation unit, upon setting correction values for correction detection values of the geomagnetism beforehand, based on the detection values and correction values, measurement results by a measuring unit and orientation calculation results are presented to a user, by a predetermined presenting unit, a predetermined operating state switchover unit switches between a normal operating state that executes the presenting processing and a suspended state that maintains a portion of processing state while stopping at least the calculation processing of the orientation; and correction values are subject to initialization by a predetermined initialization processing unit, in the case of having switched from the suspended state to the normal operating state.

Thus, even if the peripheral magnetic field and the magnetism of peripheral parts or the like have changed during time of the suspended state, the navigation device and correction value initialization method according to the above configuration can generate appropriate correction values corresponding to the magnetic field and magnetism after change, by re-learning the correction values from the beginning.

Also, a cellular phone having navigation functionality according to an embodiment of the present invention includes a measuring unit to measure the current position; a geomagnetism sensor that is provided on a predetermined main unit, and that is to detect geomagnetism; an orientation calculation unit to calculate the orientation of the main unit, upon setting correction values for correction detection values of the geomagnetism, based on the detection values and the correction values; a presenting unit to present measurement results by the measuring unit and the calculation results of the orientation to a user; an operating state switchover unit to switch between a normal operating state that executes the presenting processing and a suspended state that maintains a portion of processing state while stopping at least the calculation processing of the orientation; an initialization processing unit to initialize the correction values, in the case of having switched from the suspended state to the normal operating state by the operating state switchover unit; and a cellular phone unit to perform telephone call processing by performing wireless communication with a predetermined base station.

Thus, even if the peripheral magnetic field and the magnetism of peripheral parts or the like have changed during time of the suspended state, the cellular phone having navigation functionality according to the above configuration can generate appropriate correction values corresponding to the magnetic field and magnetism after change, by re-learning the correction values from the beginning.

According to the above configurations, even if the peripheral magnetic field and the magnetism of peripheral parts or the like have changed during time of the suspended state, appropriate correction values corresponding to the magnetic field and magnetism after change can be generated by re-learning the correction values from the beginning. Therefore a navigation device, correction value initialization method, and cellular phone having navigation functionality that can increase orientation detection accuracy by a geomagnetism sensor, can be realized.

DESCRIPTION OF THE PREFERRED EMBODIMENTS

Figure 1:
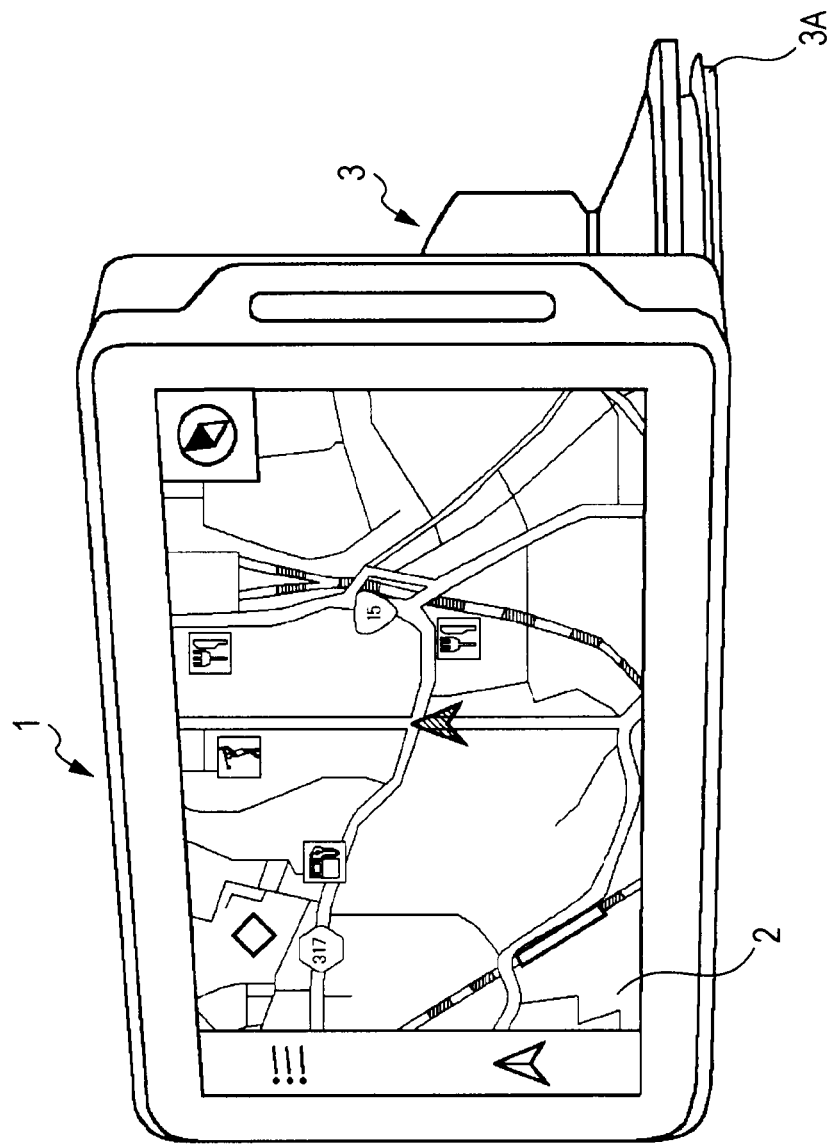
FIG. 1 is a schematic diagram illustrating an overall configuration of a PND.
Figure 2:
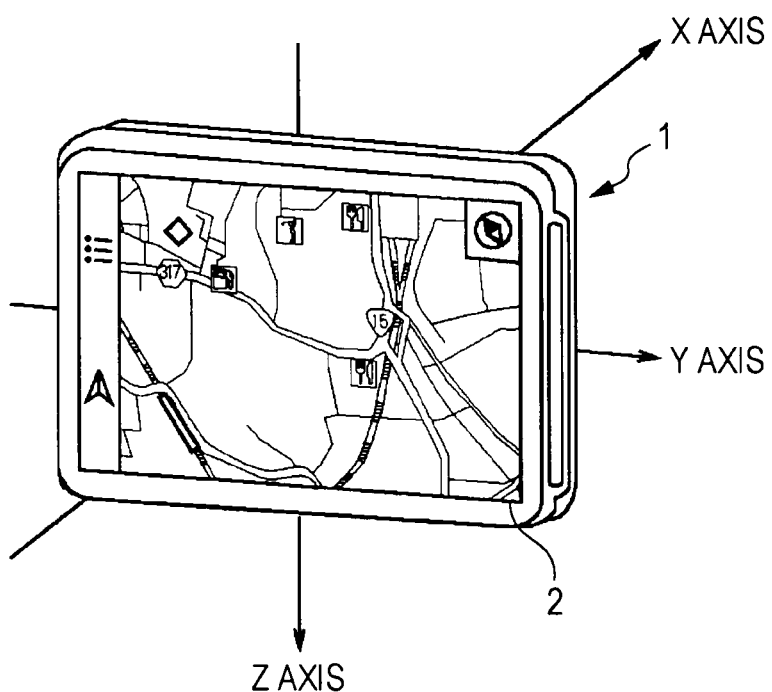
FIG. 2 is a schematic diagram illustrating a definition of a coordinate system of a PND.

Embodiments to carry out the invention (hereafter referred to simply as "embodiments") will be described with reference to the diagrams. Note that description will be given in the following order.
1. First Embodiment (PND)
2. Second Embodiment (cellular phone)
3. Other Embodiments
1. First Embodiment
1-1. Configuration of PND As shown in FIG. 1, a portable navigation device (hereafter also called PND (Personal Navigation Device)) 1 has a display unit 2 provided on the front side thereof. The PND 1 is made so as to display a map screen or the like according to map data stored in an internal non-volatile memory (unshown), for example, on a display unit 2, whereby the content thereof can be presented to a user.

Also, the PND 1 is held by a cradle 3 which is attached to a dashboard of a later-describe vehicle 9 via a suction cup 3A, and also the PND 1 and cradle 3 are connected mechanically and electrically.

Thus the PND 1 is operated by power supplied from a battery of the vehicle 9 via the cradle 9, and also when removed from the cradle 3, the PND 1 operates in an independent state by the power supplied from an internal battery.

Now, the PND 1 is disposed so that the display unit 2 thereof is roughly vertical as to the advancing direction of the vehicle 9. The coordinate system of the PND 1 at this time is displayed with the front/rear direction (advancing direction) of the vehicle 9 as the X-axis, the horizontal direction that is orthogonal to the X-axis as the Y-axis, and the vertical direction as the Z-axis.

With this coordinate system, the advancing direction of the vehicle 9 is defined as positive on the X-axis, the right direction defined as positive on the Y-axis, and the lower direction defined as positive on the Z-axis.

Figure 3:
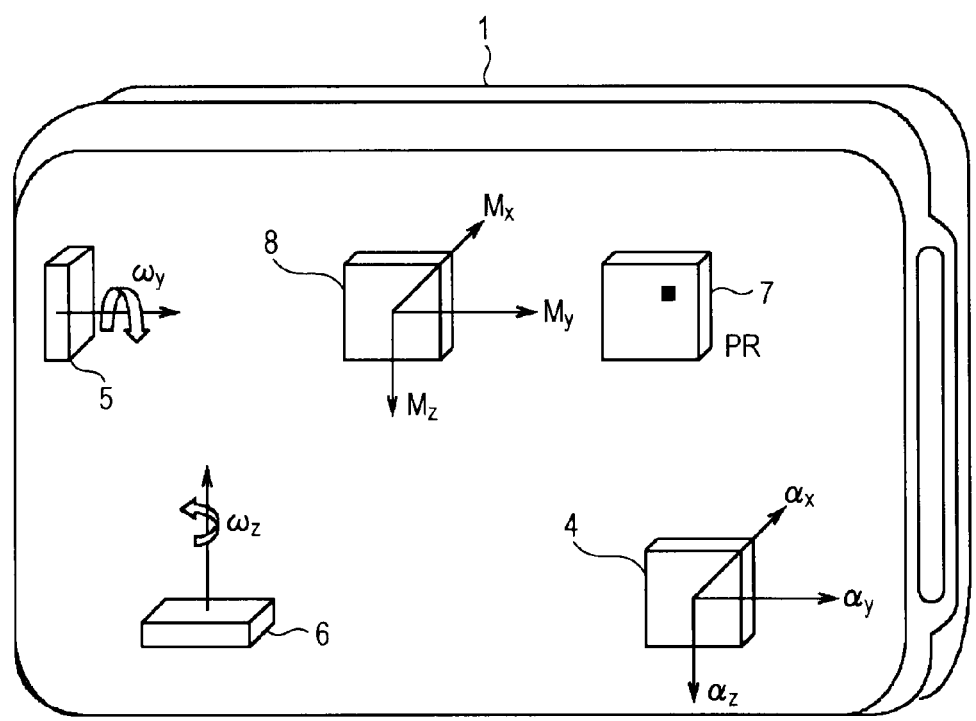
FIG. 3 is a schematic diagram illustrating a sensor configuration of a PND.

As shown in FIG. 3, the PND 1 is provided internally with a triaxial acceleration sensor 4, Y-axis gyro sensor 5, Z-axis gyro sensor 6, air pressure sensor 7, and geomagnetism sensor 8.

The triaxial acceleration sensor 4 is made so as to detect acceleration $\alpha_x$ along the X-axis, acceleration $\alpha_y$ along the Y-axis, and acceleration $\alpha_z$ along the Z-axis, respectively, as voltage values.

Also, the Y-axis gyro sensor 5, Z-axis gyro sensor 6, and air pressure sensor 7 are made so as to detect a pitch rate $\omega_y$ on the Y-axis, a yaw rate $\omega_z$ on the Z-axis, and peripheral pressure PR, respectively, as voltage values.

Further, the geomagnetism sensor 8 is made so as to detect geomagnetism $M_x$, $M_y$, and $M_z$ respectively in the X-axis direction, Y-axis direction, and Z-axis direction, respectively, as voltage values.

1-2. Computing Principles

Now, the PND 1 according to an embodiment of the present invention can also perform autonomous positioning processing to compute the current position after computing the velocity of the vehicle 9, based on the acceleration and pitch rate and so forth detected by the triaxial acceleration sensor 4, Y-axis gyro sensor 5, and so forth. Now, the basic principles for computing the velocity and current position will be described.

1-2-1. Velocity Computing Principles

Figure 4A:
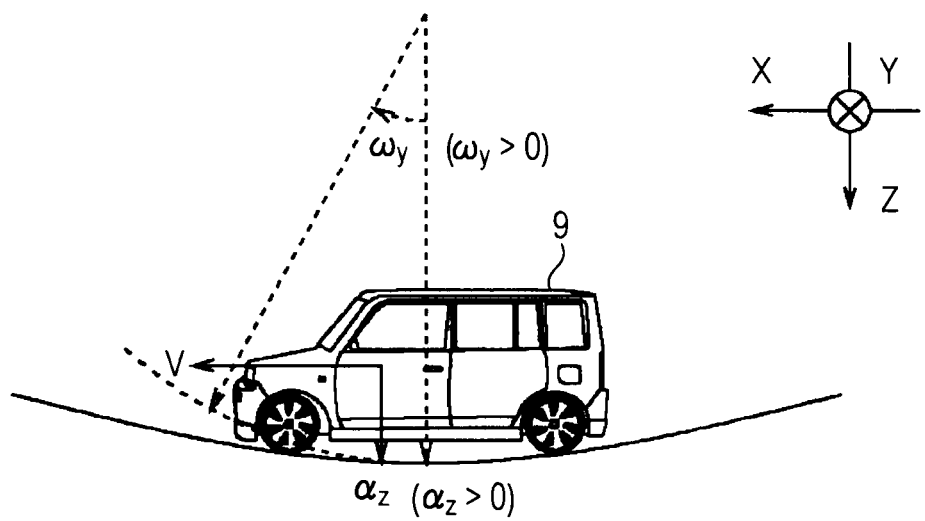
FIGS. 4A and 4B are schematic diagrams illustrating a state at time of driving on an uneven road surface.
Figure 4B:
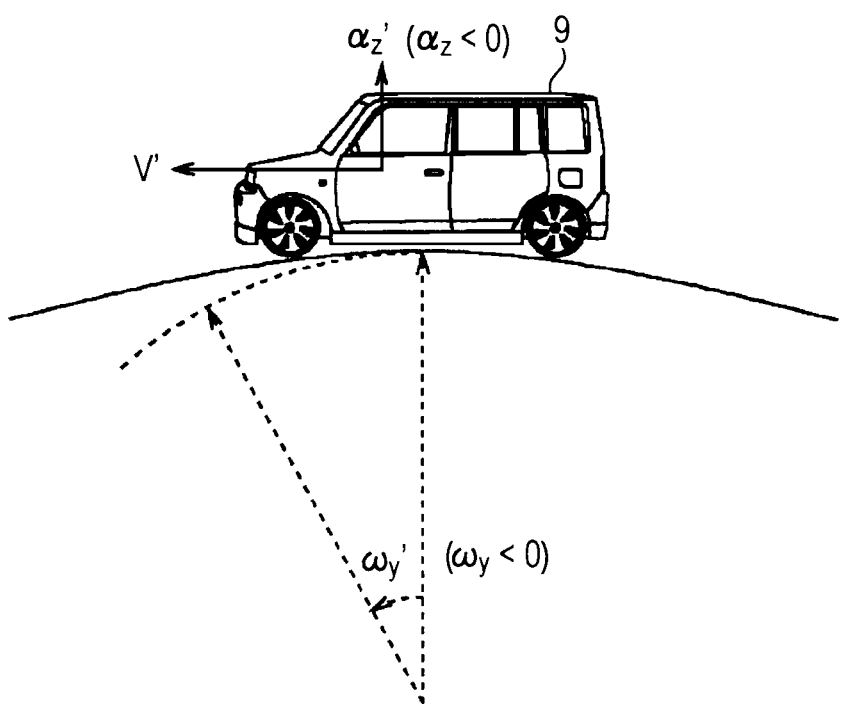

In actual practice, the vehicle 9 serving as a moving body rarely is operated on a smooth road serving as a movement surface, and in reality the vehicle 9 is operated on an overall concave-shaped road such as shown in FIG. 4A and an overall convex-shaped road such as shown in FIG. 4B.

When the vehicle 9 is operated on a concave-shaped road (FIG. 4A), the PND 1 mounted on the dashboard of the vehicle 9 detects the acceleration $\alpha_z$ in the downward direction along the Z-axis by the triaxial acceleration sensor 4 (FIG. 3), with a sampling frequency of 50 Hz, for example.

Also, the PND 1 detects the angular velocity (hereafter also called the pitch rate) $\omega_y$ on the Y-axis which is orthogonal to the advancing direction by the Y-axis gyro sensor 5 (FIG. 3), with a sampling frequency of 50 Hz.

Now, the PND 1 defines the acceleration $\alpha_z$ of the downward direction along the Z-axis as positive, and also defines the pitch rate $\omega_y$ in the event of upwards vertical rotation as to the advancing direction in a virtual circle formed along the concave-shaped road surface, such as shown in FIG. 4A, as positive.

The PND 1 uses the acceleration $\alpha_z$ detected by the triaxial acceleration sensor 4 and the pitch rate $\omega_y$ detected by the Y-axis gyro sensor 5 to enable computing the velocity V in the advancing direction 50 times per second by the following Expression (1).

$$V = \frac{\alpha_z}{\omega_y} \quad (1)$$

Also, when the vehicle 9 is operated on a convex-shaped road (FIG. 4B), the PND 1 detects the acceleration $\alpha_z$ in the upward direction along the Z-axis by the triaxial acceleration sensor 4, with a sampling frequency of 50 Hz, for example, and also detects the pitch rate $\omega_y'$ on the Y-axis by the Y-axis gyro sensor 5, with a sampling frequency of 50 Hz, for example.

The PND 1 uses the acceleration $\alpha_z'$ detected by the triaxial acceleration sensor 4 and the pitch rate $\omega_y'$ detected by the Y-axis gyro sensor 5 to enable computing the velocity V' in the advancing direction 50 times per second by the following Expression (2).

$$V' = \frac{\alpha_z'}{\omega_y'} \quad (2)$$

For ease of description, the negative acceleration $\alpha_z$ will be described as $\alpha_z'$, but actually the triaxial acceleration sensor detects the acceleration $\alpha_z'$ as a negative value of the acceleration $\alpha_z$. Also, similarly for the pitch rate $\omega_y'$, the negative pitch rate $\omega_y$ will be described as pitch rate $\omega_y'$, but actually the Y-axis gyro sensor 5 detects the pitch rate $\omega_y$ as a negative value of the pitch rate $\omega_y$. Accordingly, the velocity V' is also actually computed as velocity V.

1-2-2. Current Position Computing Principles

Next, current position computing principles to compute the current position based on the velocity V computed by the above-described velocity computing principles and the angular velocity around the Z-axis will be described.

Figure 5:
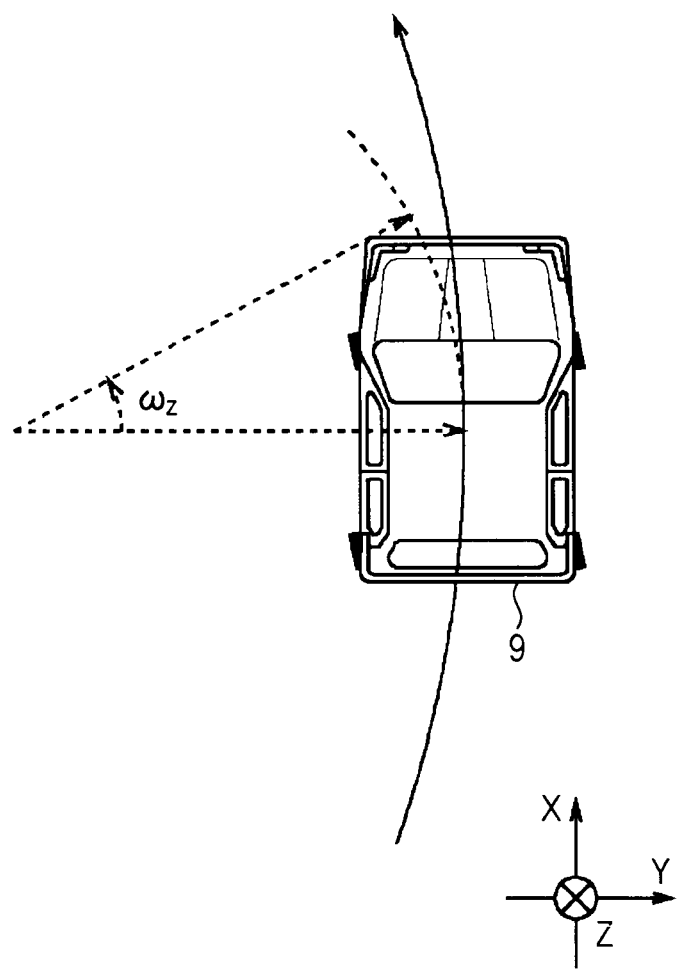
FIG. 5 is a schematic diagram illustrating a state at the time of driving around a curve.

As shown in FIG. 5, the angular velocity (yaw rate) $\omega_z$ around the Z-axis at the time that the vehicle 9 is turning in a counter-clockwise direction, for example, is detected by the Z-axis gyro sensor 6 (FIG. 3) with a sampling frequency of 50 Hz, for example.

Next, the PND 1 obtains the amount of change from the previous position P0 to the current position P1, based on the velocity V at the previous position P0 and an angle θ obtained by multiplying the yaw rate $\omega_z$ detected by the gyro sensor by the sampling frequency (in this case, 0.02 seconds). The PND 1 can then compute and obtain the current position P1 by adding the amount of change thereof to the previous position P0.

1-3. Circuit Configuration of PND

Figure 7:
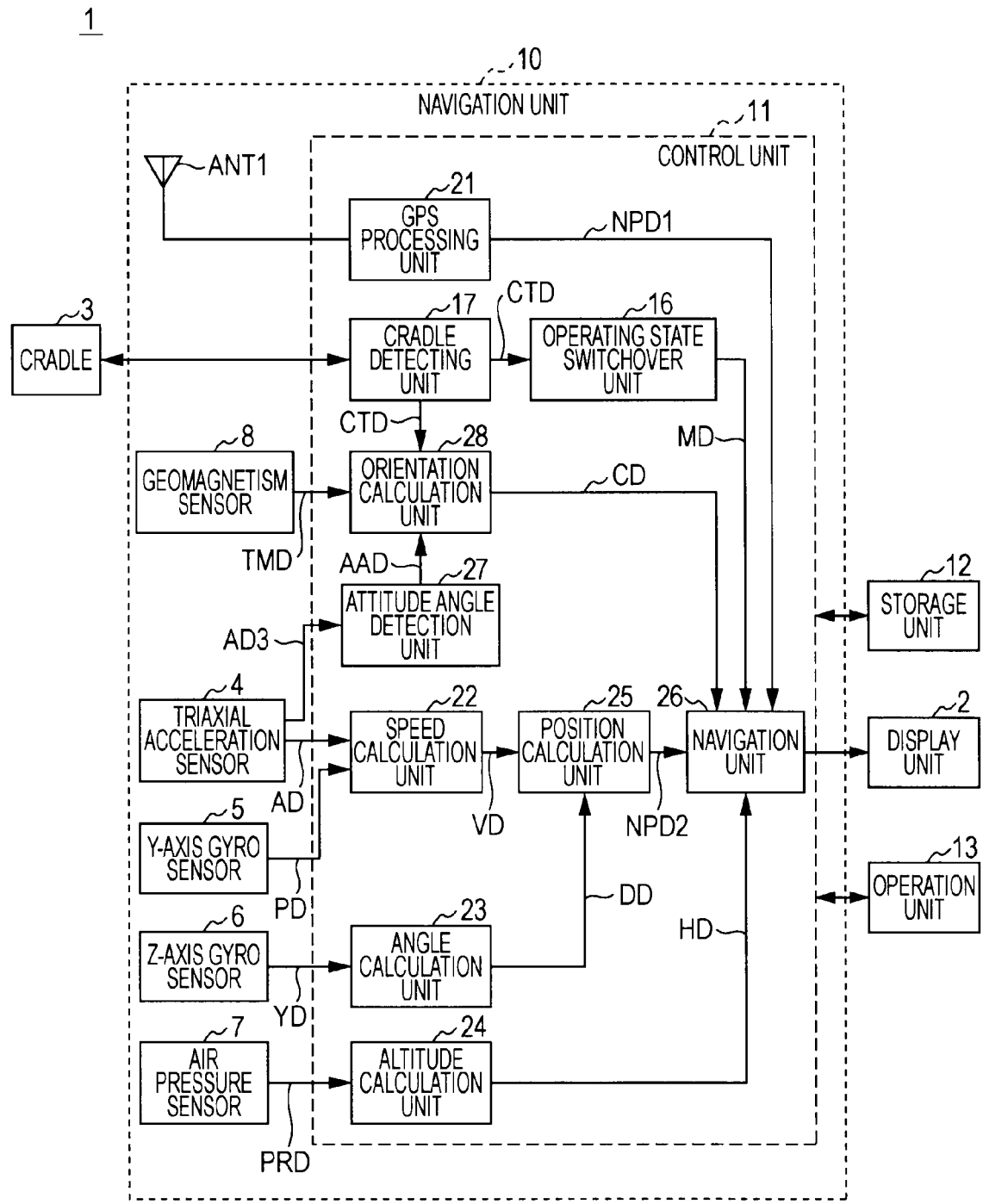
FIG. 7 is a schematic diagram illustrating a PND circuit configuration.

As shown in FIG. 7, the PND 1 is configured around a control unit 11 and a navigation unit 10 that is provided with various types of sensors and realizes navigation functions.

The control unit 11 is made up of a CPU (Central Processing Unit), and performs centralized control of the entire device following a basic program read out from a storage unit 12 made up of a non-volatile memory, for example.

Also, the PND 1 executes later-described current position computing processing and initializing processing and the like, according to various types of application programs read out by the control unit 11 from the storage unit 12.

Further, the PND1 has an operating unit 13 made up of a touch panel that is integrated with the display unit 2, an unshown power switch, and so forth. Upon receiving operating instruction from the user via the touch panel or power switch, the operating unit 13 notifies the operating content thereof to the control unit 11.

The control unit 11 is made so as to perform processing according to the user operating content such as setting a destination and so forth, according to the operating content notified from the operating unit 13.

Also, the control unit 11 is made so as to function as an operating state switchover unit 16. That is to say, in the case that the power switch of the operating unit 13 is operated, the operating state switchover unit 16 is switched between a power-on state which operates the entire PND 1, a power-off state which completely stops the operations of the entire PND1, and a suspended state.

In the case of being switched from the power-on state to the suspended state, the control unit 11 stops the operations of the various sensors and the display unit 2 and the like, continues operations for only a portion of functions of the control unit 11, and hold various types of data and the like from immediately prior to switching.

Also, in the case of being switched from the suspended state to the power-on state, the control unit 11 immediately restores the operating state from immediately prior to switching to the suspended state, based on the various data and so forth being held, and starts the operations thereof.

Incidentally, the operating state switchover unit 16 can return from the suspended state to the power-on state in the case that the engine of the vehicle 9 is turned on and power is supplied in the state of the PND 1 having been attached to the cradle 3, as well.

Further, the PND 1 is made so as to be switched between the operating modes of a vehicle-mounted mode that performs navigation processing in the state of being mounted to the vehicle 9 via the cradle 3 (FIG. 1)*and* a walk mode that performs navigation processing in the state of being removed from the cradle 3 and held by a user who is primarily moving by walking.

Also the control unit 11 functions as a cradle detecting unit 17. The cradle detecting unit 17 periodically (e.g., every 3 seconds) detects whether or not the PND 1 is electrically connected to the cradle 3, and generates a cradle detection signal CTD which represents the detection results thereof and supplies this to the operating state switchover unit 16.

The operating state switchover unit 16 switches the operating mode of the overall control unit 11, based on the cradle detecting signal CTD, to vehicle-mounted mode in the case of being connected to the cradle 3, and switches to walk mode in the case of not being connected to the cradle 3.

For example, in the case that the cradle detecting unit 17 detects that the PND 1 is attached to the cradle 3, a cradle detecting signal CTD to this effect is supplied to the operating state switchover unit 16.

Accordingly, the operating state switchover unit 16 switches the operating mode of the PND 1 to vehicle-mounted mode. In the case of vehicle mounted mode, the control unit 11 functions as a GPS processing unit 21, velocity calculation unit 22, angle computing unit 23, height computing unit 24, position computing unit 25, and navigation unit 26.

In the case of being able to receive a GPS signal from a GPS satellite, the control unit 11 in vehicle-mounted mode can perform GPS measuring processing for measuring based on the GPS signal thereof.

That is to say, the PND 1 transmits the multiple GPS signals from the GPS satellites received by a GPS antenna ANT1 to the GPS processing unit 21 of the control unit 11.

The GPS processing unit 21 obtains current position data NPD 1 by accurately measuring the current position of the vehicle 9 based on the equator data obtained by demodulating multiple GPS signals and distance from the multiple GPS satellites to the vehicle 9, and transmits this to the navigation unit 26.

The navigation unit 26 obtains an operating mode signal MD which represents the switching result of the operation mode from the operating state switchover unit 16, and executes navigation processing according to the operation mode at the time thereof.

In this case the mode is vehicle-mounted mode, whereby the navigation unit 26 reads out map data of the surroundings which includes the current position of the vehicle 9, based on the current position data NPD 1, and generates a map image which includes the current position thereof, after which this is output to the display unit 2, thereby displaying the map image.

Also, the PND 1 does not perform GPS measuring processing when a GPS signal is not received from the GPS satellite. Thus, primarily when the GPS signal is not received, the PND 1 can perform autonomous positioning processing to compute the current position after computing the velocity V, based on the acceleration and pitch rate and so forth detected by the triaxial acceleration sensor 4, Y-axis gyro sensor 5, and so forth.

That is to say, the triaxial acceleration sensor 4 detects the accelerations $\alpha_x$, $\alpha_y$, and $\alpha_z$ with a sampling frequency of 50 Hz, for example, and of the accelerations $\alpha_x$, $\alpha_y$, and $\alpha_z$, acceleration data AD showing the acceleration $\alpha_z$ is transmitted to the velocity calculation unit 22 of the control unit 11.

The Y-axis gyro sensor 5 detects the pitch rate $\omega_y$ with a sampling frequency of 50 Hz, for example, and the pitch rate data PD showing the pitch rate $\omega_y$ is transmitted to the velocity calculation unit 22 of the control unit 11.

The velocity calculation unit 22 computes the velocity V 50 times per second using the Expression (1), based on the acceleration $\alpha_z$ which corresponds to the acceleration data AD supplied from the triaxial acceleration sensor 4, and the pitch rate $\omega_y$ which corresponds to the pitch rate data PD supplied from the Y-axis gyro sensor 5, and transmits the velocity data VC showing the velocity V to the position computing unit 25.

Also, the Z-axis gyro sensor 6 detects the yaw rate pitch rate $\omega_y$ with a sampling frequency of 50 Hz, for example, and the yaw rate data YD showing the yaw rate $\omega_z$ is transmitted to the angle computing unit 23 of the control unit 11.

The angle calculation unit 23 multiplies the sampling frequency (in this case, 0.02 seconds) by the yaw rate wz which corresponds to the yaw rate data YD supplied from the Z-axis gyro sensor 6, thereby computing the angle θ at the time of a clockwise or counter-clockwise turn by the vehicle 9, and transmits the angle data DD showing the angle θ to the position calculation unit 25.

Figure 6:
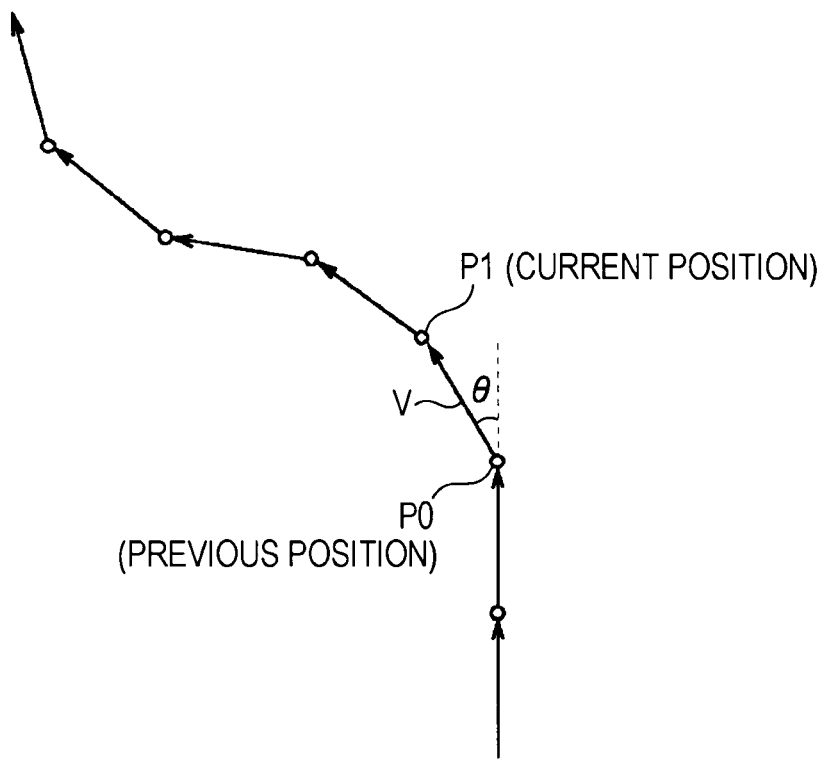
FIG. 6 is a schematic diagram illustrating a current position computing method using velocity and angle.

The position calculation unit 25 finds the amount of change from the previous position P0 such as shown in FIG. 6 to the current position P1, based on the angle θ which corresponds to the angle data DD supplied from the angle calculation unit 23 and velocity V which corresponds to the velocity data VD supplied from the velocity calculation unit 22. The position computing unit 25 then computes the current position P1 by adding the amount of change there to the previous position P0, and transmits the current position data NPD 2 showing the current position P1 thereof to the navigation unit 26.

On the other hand, the air pressure sensor 7 detects the ambient air pressure PR with a sampling frequency of 50 Hz, for example, and transmits the pressure data PRD showing the pressure PR to the altitude calculation unit 24.

The altitude calculation unit 24 computes the altitude of the vehicle 9 based on the air pressure PR which corresponds to the pressure data PRD supplied from the air pressure sensor 7, and transmits the altitude data HD showing the altitude thereof to the navigation unit 26.

The navigation unit 26 reads out, from the storage unit 12, map data of the surroundings which includes the current position of the vehicle 9, based on the current position data NPD 2 which is supplied from the position calculation unit 25 and altitude data HD supplied from the altitude calculation unit 24, and generates a map image which includes the current position thereof, after which this is output to the display unit 2, thereby displaying the map image.

1-4. Velocity calculation Processing

Next, velocity calculation processing to calculate the velocity V with the velocity calculation unit 22, based on the acceleration $\alpha_z$ which corresponds to the acceleration data AD supplied from the triaxial acceleration sensor 4 and the pitch rate $\omega_y$ which corresponds to the pitch rate data PD supplied from the Y-axis gyro sensor 5, will be described.

Figure 8:
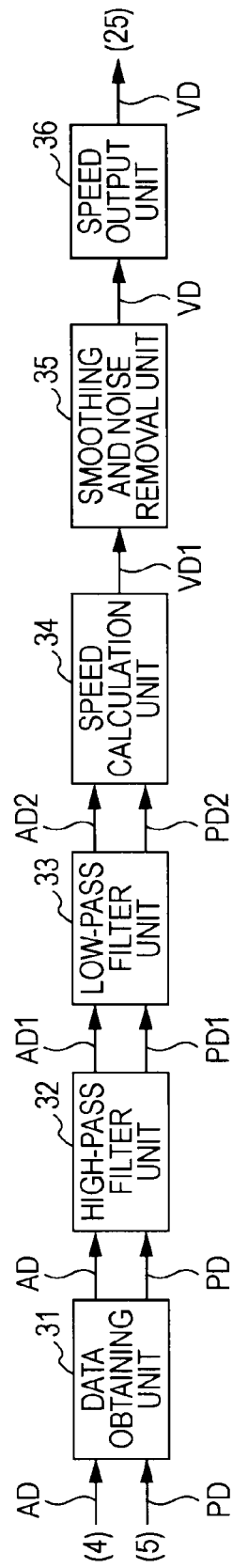
FIG. 8 is a schematic diagram illustrating a configuration of a velocity calculation unit.

In the event of executing velocity calculation processing, the velocity calculation unit 22 functions as a data obtaining unit 31, high-pass filter unit 32, low-pass filter unit 33, velocity calculation unit 34, smoothing and noise removal unit 35, and velocity output unit 36, as shown in FIG. 8.

The data obtaining unit 31 of the velocity calculation unit 22 obtains the acceleration data AD supplied from the triaxial acceleration sensor 4 and the pitch rate data PD supplied from the Y-axis gyro sensor 5, and transmits the acceleration data AD and pitch rate data PD to the high-pass filter unit 32.

The high-pass filter unit 32 cuts the direct current components of the acceleration data AD and pitch rate data PD supplied from the data obtaining unit 31, and transmits the acceleration data AD1 and pitch rate data PD1 obtained as a result thereof to the low-pass filter unit 33.

The low-pass filter unit 33 performs later-described low-pass filter processing as to the acceleration data AD1 and pitch rate data PD1 supplied from the high-pass filter unit 32, and transmits the acceleration data AD2 and pitch rate data PD2 obtained as a result thereof to the velocity calculation unit 34.

The velocity calculation unit 34 performs later-described velocity calculation processing as to the acceleration data AD2 and pitch rate data PD2 supplied from the low-pass filter unit 33, and transmits the velocity data VD1 obtained as a result thereof to the smoothing and noise removal unit 35.

The smoothing and noise removal unit 35 performs predetermined smoothing and noise removal processing as to the velocity data V1 supplied from the velocity calculation unit 34, reduces the error difference included in the velocity V, and transmits the velocity data VD obtaining as a result thereof to the velocity output unit 36.

The velocity output unit 36 transmits the velocity data VD supplied from the smoothing and noise removal unit 35 to the position calculation unit 25.

Thus, the velocity calculation unit 22 calculates the velocity V of the vehicle 9 based on the acceleration data AD supplied from the triaxial acceleration sensor 4 and the pitch rate data PD supplied from the Y-axis gyro sensor 5.

1-4-1. Low-pass Filter Processing

Next, the low-pass filter processing performed by the low-pass filter unit 33 as to the acceleration data AD1 and pitch rate data PD1 supplied from the high-pass filter unit 32 will be described.

As described above, with the PND 1 mounted on the vehicle 9, the pitch rate $\omega_y$ resulting from the twisting of the road in the advancing direction of the vehicle 9 is detected by the Y-axis gyro sensor 5.

While details will be omitted, as a result of an experiment, it has been shown that with the PND 1 at this time, the pitch rate $\omega_y$ is detected as a vibration of 1 to 2 Hz regardless of the driving velocity of the vehicle 9.

Figure 9:
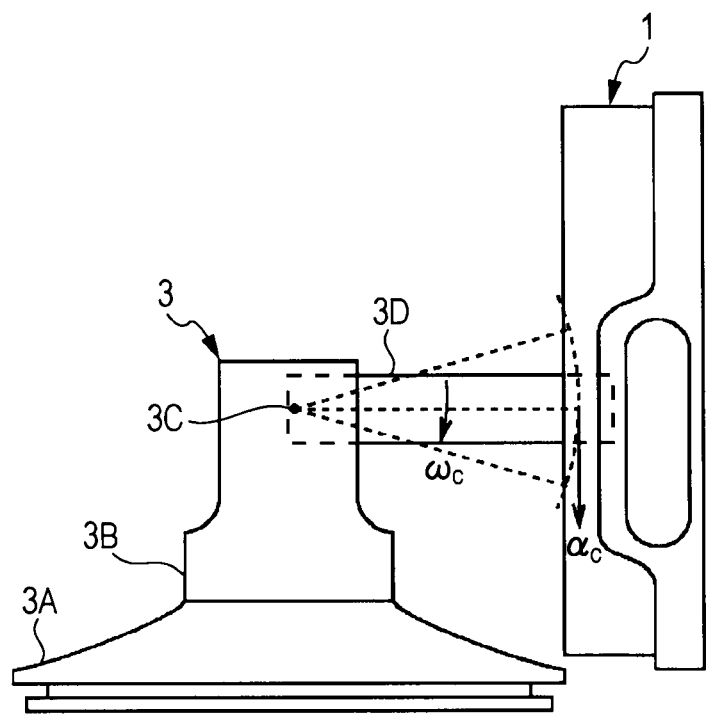
FIG. 9 is a schematic diagram illustrating a state of vibration from a cradle.
Figure 10:
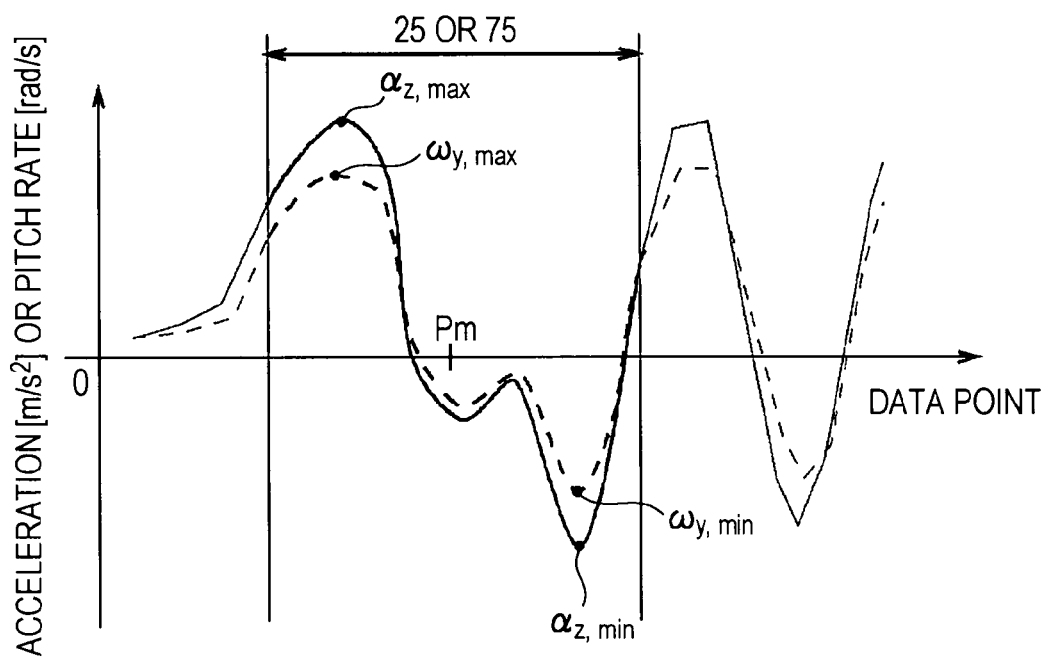
FIG. 10 is a schematic diagram illustrating the relation between maximum value and minimum value.

Now, the PND1 is held by the cradle 3 which is attached to the dashboard of the vehicle 9 via a suction cup 3A. As shown in FIG. 9, the cradle 3 has a cradle main unit 3B provided above the suction cup 3A, one end thereof is supported by a bearing point 3C provided at a position at a predetermined height on the cradle main unit 3B, and a PND bearing unit 3D is provided to support the PND 1 with the other end.

Therefore, in the event that the vehicle 9 vibrates according to the twists in the road, the PND 1 vibrates with acceleration $\alpha_c$ and angular velocity $\omega_c$ for example, in the vertical direction with the bearing point 3C of the PND bearing unit 3D as the center thereof.

As a result of experiments and the like, the PND 1 has been confirmed to detect, with the Y-axis gyro sensor 5, the pitch rate $\omega_y$ which vibrates at 1 to 2 Hz according to the twists in the road as described above, and added angular velocity $\omega_{cy}$ that is synthesized with the angular velocity $\omega_c$ which receives vibrations of approximately 15 Hz from the cradle.

Also confirmed is that the PND 1 detects, with the triaxial acceleration sensor 4, the acceleration $\alpha_z$ which vibrates at 1 to 2 Hz according to the twists in the road as described above, and added acceleration $\alpha_{cz}$ that is synthesized with the acceleration $\alpha_c$ which receives vibrations of approximately 15 Hz from the cradle 3.

Thus the low-pass filter unit 33 performs low-pass filter processing as to the acceleration data AD 1 and pitch rate data PD 1 supplied from the high-pass filter unit 32, and removes the 15 Hz frequency components, i.e. each of the acceleration $\alpha_c$ and angular velocity $\omega_c$ which occur from the PND 1 being held by the cradle 3.

That is to say, by removing the acceleration $\alpha_c$ from the added acceleration $\alpha_{cz}$, the low-pass filter unit 33 can extract only the acceleration $\alpha_z$ which occurs from the twists in the road. Also, by removing the angular velocity $\omega_c$ from the added angular velocity $\omega_{cz}$, the low-pass filter unit 33 can extract only the pitch rate $\omega_y$ which occurs from the twists in the road.

1-4-2. Velocity Calculation Processing

Next, the velocity calculation processing to calculate the velocity V with the velocity calculation unit 34, based on the acceleration data AD2 and pitch rate data PD2 supplied from the low-pass filter unit 33, will be described.

Generally, for a position to mount the PND 1 in the vehicle 9, various locations may be considered, such as on the dashboard which the front side of the vehicle 9 or near the rear windshield which is on the rear side of the vehicle 9, for example.

While details will be omitted, as a result of experimenting, it has been shown that with the PND 1 at this time, the phase of the acceleration $\alpha_z$ detected with the PND 1 mounted on the rear side of the vehicle 9 is delayed as compared to the acceleration $\alpha_z$ detected with the PND 1 mounted on the front side. Thus, the PND 1 uses data in a certain range of the pitch rate data PD2.

Now, in the case that the velocity V of the vehicle 9 is a slow velocity, the acceleration $\alpha_z$ and pitch rate $\omega_y$ change suddenly due to minor changes in the road surface. Thus the velocity calculation unit 34 sets the range of the data to be used to 25 data point, i.e. sets a narrow range, to handle the sudden changes thereof.

Also, in the case that the velocity V of the vehicle 9 is a high velocity, influence from the suspension of the vehicle 9 is great, and the acceleration $\alpha_z$ and pitch rate $\omega_y$ change slowly.

Thus, in order to handle the slow changes, the velocity calculation unit 34 sets the data range to be used to be 75 data points, i.e. sets a wide range.

Specifically, the velocity calculation unit 34 extracts a maximum value and minimum value from the range of 25 data points or 75 data points centered by a data point Pm corresponding to the previous position P0 (FIG. 6) of the acceleration $\alpha_z$ which corresponds to the acceleration data AD2 supplied from the low-pass filter unit 33, as a maximum acceleration $\alpha_{z,max}$ and minimum acceleration $\alpha_{z,min}$, respectively.

Also, the velocity calculation unit 34 extracts a maximum value and minimum value from the range of 25 data points or 75 data points centered by a data point Pm of the pitch rate $\omega_y$ which corresponds to the pitch rate data PD2 supplied from the low-pass filter unit 33, as a maximum pitch rate $\omega_{y,max}$ and minimum pitch rate $\omega_{y,min}$.

That is to say, the velocity calculation unit 34 extracts, from a range wider than the phase shift that can occur in the acceleration $\alpha_z$ and pitch rate $\omega_y$, the maximum acceleration $\alpha_{z,max}$ and minimum acceleration $\alpha_{z,min}$ and the maximum pitch rate $\omega_{y,max}$ and minimum pitch rate $\omega_{y,min}$, respectively.

The velocity calculation unit 34 uses the maximum acceleration $\alpha_{z,max}$ and minimum acceleration $\alpha_{z,min}$ extracted from the acceleration data AD2 and the maximum pitch rate $\omega_{y,max}$ and minimum pitch rate $\omega_{y,min}$ extracted from the pitch rate data PD2 to compute the velocity V in the advancing direction at the previous position P0 (FIG. 3) with the Expression (3) which is a modification of the above-described Expression (1).

$$V = \frac{\alpha_{z,max} - \alpha_{z,min}}{\omega_{y,max} - \omega_{y,min}} \quad (3)$$

Subsequently the velocity calculation unit 34 transmits the velocity data VD1 representing the velocity V to the smoothing and noise removal unit 35.

That is to say, even in the case that a phase shift is occurring in the acceleration $\alpha_z$ and pitch rate $\omega_y$, by using the Expression (3) the velocity calculation unit 34 can calculate the velocity V with the phase shift influences removed.

Thus the velocity calculation unit 34 can reflect the state of the road surface and vehicle 9 according to the velocity V, by switching between the data ranges according to the velocity V of the vehicle 9 in the event of extracting the maximum acceleration $\alpha_{z,max}$ and minimum acceleration $\alpha_{z,min}$ and the maximum pitch rate $\omega_{y,max}$ and minimum pitch rate $\omega_{y,min}$, thereby enabling improved calculation accuracy of the velocity V.

Figure 11:
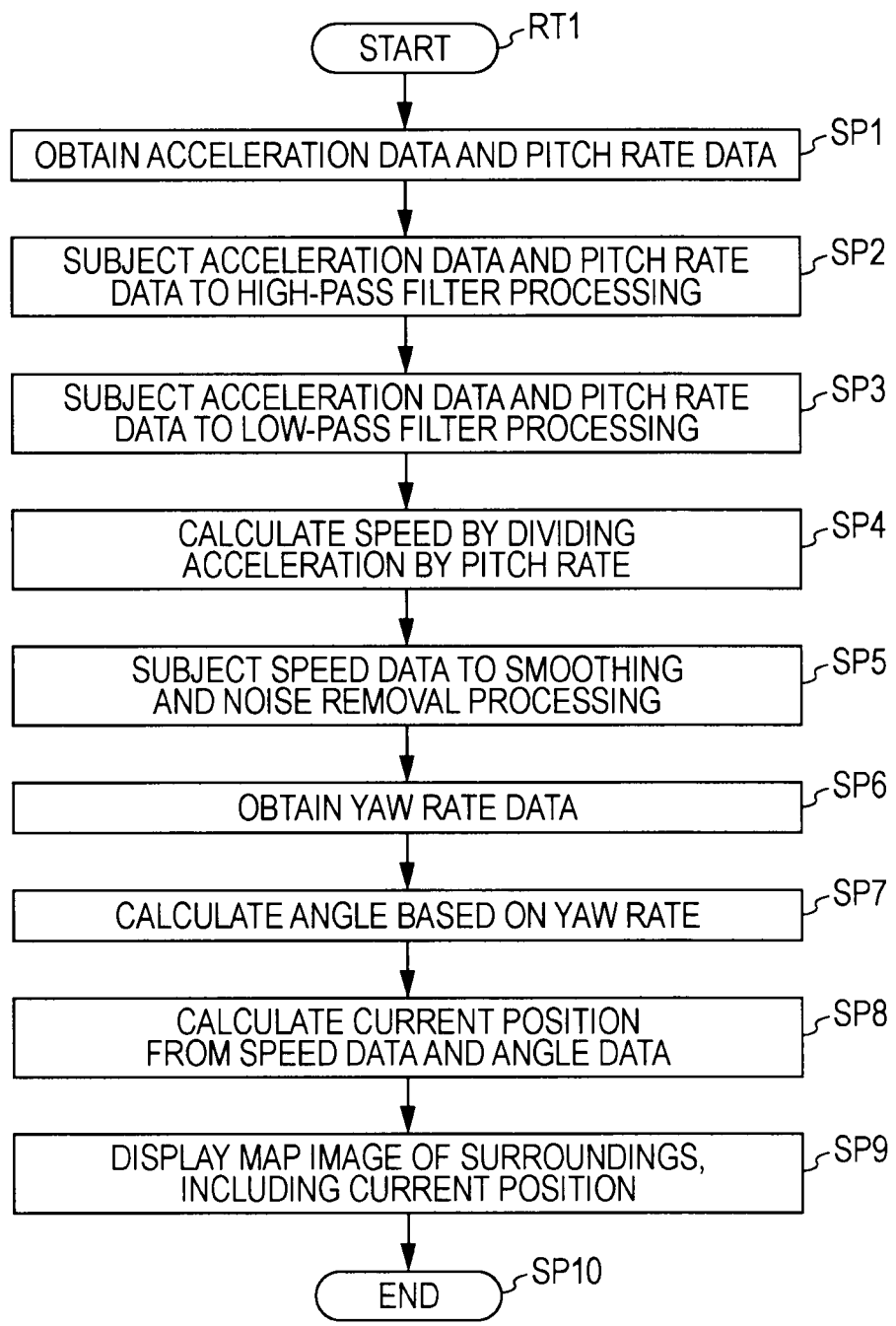
FIG. 11 is a flowchart to accompany description of current position computing processing procedures which uses the velocity computing processing.

1-4-3. Position Calculating Processing Procedures Using Velocity Calculation Processing Next, current position calculating processing procedures for the control unit 11 of the PND 1 to calculate the current position using a velocity calculation processing such as described above will be described with reference to the flowchart in FIG. 11.

In actual practice, the control unit 11 enters from the starting step of a routine RT1 and advances to step SP1, and obtains the acceleration data AD detected by the triaxial acceleration sensor 4 and the pitch rate data PD detected by the Y-axis gyro sensor 5 with the data obtaining unit 31 of the velocity calculation processing unit 22, and subsequently advances to the following step SP2.

In step SP2 the control unit 11 performs high-pass filter processing as to the acceleration data AD and pitch rate data PD with the high-pass filter unit 32 of the velocity calculation processing unit 22, and advances to the following step SP3.

In step SP3 the control unit 11 performs low-pass filter processing which is a 4th order IIR filter with a cut-off frequency of 1 Hz, for example, as to the acceleration data AD1 and pitch rate data PD1 subjected to high-pass filter processing, with the low-pass filter unit 33 of the velocity calculation unit 22, and advances to the following step SP4.

In step SP4 the control unit 11 calculates the velocity V by the velocity calculation unit 34 of the velocity calculation unit 22, using the Expression (3), based on the acceleration $\alpha_z$ which corresponds to the acceleration data AD2 and the pitch rate $\omega_y$ which corresponds to the pitch rate data PD2 that are subjected to low-pass filter processing, and advances to the following step SP5.

In step SP5 the control unit 11 performs smoothing and noise removal processing as to the velocity data VD which indicates the velocity V calculated in step SP4.

Specifically, the control unit 11 performs low-pass filter processing which has caused the cut-off frequency to be variable as to the velocity data VD1 which indicates the velocity V calculated in step SP4, and advances to the following step SP6.

In step SP6 the control unit 11 obtains yaw rate data YD detected by the Z-axis gyro sensor 6 with the angle calculation unit 23, and advances to the following step SP7.

In step SP7 the control unit 11 multiplies the yaw rate $\omega_z$ which corresponds to the yaw rate data YD by 0.02 seconds which is a sampling frequency, thereby calculating the angle data DD which indicates the angle $\theta$ with the angle calculation unit 23, and advances to the following step SP8.

In step SP8 the control unit 11 calculates the current position data NPD2 based on the velocity data VD subjected to smoothing and noise reduction processing in step SP5 and the angle data DD calculated in step SP8, and advances to the following next SP9.

In step SP9 the control unit 11 reads out map data of the surroundings which includes the current position of the vehicle 9, based on the current position data NPD 2 which is supplied from the position calculation unit 25, and generates a map image which includes the current position thereof. Subsequently the control unit 11 outputs the generated map image to the display unit 2, advances to the following step SP10, and ends the series of processing.

1-5. Detection of Orientation
1-5-1. Orientation Detection Processing

Now, in the case that the cradle detecting unit 17 of the control unit 11 (FIG. 7) detects that the PND1 has been removed from the cradle 3, a cradle detecting signal CTD is supplied to the operating state switchover unit 16.

Accordingly the operating state switchover unit 16 switches the operating mode of the PND 1 to walk mode. In the case of walk mode, the control unit 11 functions as an attitude angle detection unit 27 and orientation calculation unit 28, in addition to the GPS processing unit 21 and navigation unit 26 which are similar to the vehicle-mounted mode.

The attitude angle detection unit 27 first obtains triaxial acceleration data AD3 wherein accelerations $\alpha_x$, $\alpha_y$, and $\alpha_z$ are indicated, from the triaxial acceleration sensor 4. Next, the attitude angle detection unit 27 performs predetermined attitude angle detection processing based on the obtained triaxial acceleration data AD3, thereby generating attitude angle data AAD that represents the attitude angle of the PND 1, and supplies this to the orientation calculation unit 28.

The orientation calculation unit 28 obtains geomagnetism data TMD wherein geomagnetism $M_x$, $M_y$, and $M_z$ are indicated, from the geomagnetism sensor 8, and performs predetermined correction processing (details to be described later).

Next, the orientation calculation unit 28 performs predetermined orientation calculation processing based on the attitude angle data AAD obtained from the corrected geomagnetism data TMD and the attitude angle detecting unit 27, thereby generating orientation data CD that represents the orientation of the PND 1, and supplies this to the navigation unit 26.

That is to say, the PND1 functions as a so-called electronic compass with the geomagnetism sensor 8, triaxial acceleration sensor 4, attitude angle detection unit 27, and orientation calculation unit 28, and generates orientation data CD.

The navigation unit 26 reads out map data of the surroundings which includes the current position based on the current position data NPD 1, and generates a map image which includes the current position thereof and matches the current orientation of the PND1, based on the orientation data CD, after which this is output to the display unit 2, thereby displaying the map image.

Now, in the case of a metallic object or magnetic body being nearby, the geomagnetism sensor 8 does not correctly detect geomagnetism because of the nature thereof. Therefore, in the case that the PND 1 is inside the vehicle 9 which is a large metallic object, the orientation calculation unit 28 may not generate orientation data CD that indicates the correct orientation.

Thus, in the case that the PND 1 is attached to the cradle 3, the orientation calculation unit 28 determines that the PND 1 is inside the vehicle 9, and does not generate orientation data CD.

Incidentally, in the case detection is made that the PND 1 is attached to the cradle 3, the operating state switchover unit 16 stops the operations of the geomagnetism sensor 8, attitude angle detection unit 27, and orientation calculation unit 28, suppressing power consumption.

1-5-2. Correction Processing of Geomagnetism Data by Correction Values

Now, due to the nature thereof, the geomagnetism sensor 8 receives influences from magnetic bodies such as metal and the like that exists nearby and from magnetism in the metallic parts such as a shield plate (unshown) provided in the PND 1, whereby errors are included in the geomagnetism data TMD.

Thus, in the event of starting to obtain geomagnetism data TMD that indicates geomagnetism $M_x$, $M_y$, and $M_z$, from the geomagnetism sensor 8, the orientation calculation unit 28 of the control unit 11 sets correction values to correct the geomagnetism data TMD, threshold values to represent normal value ranges, or the like (hereafter these are called learning values LN).

Incidentally, in the case of performing initializing processing, the orientation calculation unit 28 displays a message such as "move the main unit in a figure-8 motion" on the display unit 2, for example, to cause the user to trace the shape of the number "8" with the entire PND 1, and generates learning values LN using the geomagnetism data TMD obtained at this time.

Subsequently the orientation calculation unit 28 subjects the geomagnetism data TMD to predetermined correction processing, using the correction values of the learning values LN, thereby correction the geomagnetism data TMD, and generates the above-described orientation data CD based on the corrected geomagnetism data TMD.

Also, there are cases wherein the magnetism of metallic parts and so forth provided within the PND 1 changes when the user holding the PND 1 passes by a location having a particularly strong magnetic field. Such magnetism change has been found to influence the geomagnetism data TMD.

Thus, the orientation computation unit 28 determines whether or not the geomagnetism data TMD obtained from the geomagnetism sensor 8 is within a normal range, and generates the orientation data CD, using the geomagnetism data TMD only when within a normal range.

On the other hand, in the case the geomagnetism data TMD obtained from the geomagnetism sensor 8 is not within a normal range, the orientation calculation unit 28 updates the correction values and threshold values and so forth of the learning values LN, based on the geomagnetism data TMD, as appropriate.

Incidentally, the orientation calculation unit 28 stores the geomagnetism data TMD for a fixed time period in the past (e.g. 30 seconds) in the storage unit 12. In the event of updating the learning values LN, the orientation calculation unit 28 uses the past geomagnetism data TMD stored in the storage unit 12.

Also, each time the number of updates of the learning values LN is increased, the accuracy of the correction processing by the correction values of the learning values LN is thought to increase in the geomagnetism data TMD. That is to say, the learning values LN can increase the accuracy of correction as to the geomagnetism data TMD, according to the degree of the update.

Therefore, regarding the learning values LN, in the case that the number of updates is large and accuracy is high, i.e. in the case that the degree of learning is high, and if the correction values or threshold values are modified greatly, this can result in a decrease in accuracy.

Thus, the orientation calculation unit 28 manages the degree of updating of the learning values LN, i.e. the degree of learning as a learning level LL, and limits the modification range of the learning values LN according to the learning level LL.

1-5-3. Geomagnetism Data Correction Processing when Returning from Suspended State Now, as described above, the PND 1 can be shifted to a suspended state wherein the operations of the various sensors and the like are stopped, according to user operations. For example, while the user is using the PND 1 in walk mode, the user may shift the PND 1 to a suspended state because of stopping by a nearby store or the like.

Even in the event of the PND1 being carried in the suspended state, the metallic parts and so forth within the PND 1 are influenced by the magnetic fields of the metallic bodies and magnetic bodies or the like existing nearby, and can change to the magnetism thereof.

On the other hand, the PND 1 operates a portion of functions within the control unit 11 even when in a suspended state, and holds the learning values LN and learning levels LL as well.

Subsequently, in the case that the PND 1 returns to the power-on state from the suspended state, the various types of data being held are used without change, and various types of processing such as the navigation processing begins immediately.

However, with the PND 1, the peripheral magnetic field can greatly differ from immediately prior to the shift to a suspended state and immediately following returning to the power-on state from the suspended state.

Also, even if the peripheral magnetic field immediately prior to the transfer to the suspended state is the same as immediately following returning to the power-on state from a suspended state, the magnetism in the metallic parts or the like in the PND 1 can have changed during the suspended time.

In such a case, the geomagnetism sensor 8 generates geomagnetism data TMD that is influenced by changes to the peripheral magnetic field and changes to the magnetism in the metallic parts and the like in the PND 1.

At this time even if the orientation calculation unit 28 of the control unit 11 corrects the geomagnetism data TMD using the correction values of the learning values LN that are held from before suspending, the corrections are not made correctly, whereby the accuracy of the orientation data CD that is generated is greatly reduced.

In the case that the degree of magnetism change in the metallic parts and the like within the PND 1 is relatively small, the geomagnetism data TMD is influenced by the change in magnetism and becomes a value that includes the error, but on the other hand, the value thereof falls within a normal range. Therefore the orientation calculation unit 28 may not be able to determine from only the range of the geomagnetism data TMD obtained that the learning values LN are to be updated.

Further, in the case that the learning level LL is relatively high, even if the learning values LN are updated, the orientation calculation unit 28 is limited in the modification range of correction values and the like due to the height of the learning levels LL, and may not be able to appropriately update.

Thus, upon a return from the suspended state to the power-on state, regardless of the previous learning level LL, the orientation calculation unit 28 serving as the initialization processing unit performs initializing processing to return the learning value LN and learning level LL to the initial values.

In other words, upon a return from the suspended state to the power-on state, similar to when the power-off state is switched to the power-on state, the orientation calculation unit 28 re-learns the learning values LN from an unlearned state, and the learning levels LL are also restarted from the lowest level.

Thus, even if a change in peripheral magnetic field before and after being suspended, or a magnetism change occurs in the metallic parts or the like in the PND 1 that is suspended, the orientation calculation unit 28 can remove the influences thereof and generate appropriate learning values LN, and can appropriately correct geomagnetism data TMD.

Also, the orientation calculation unit 28 can delete past geomagnetism data TMD stored in the storage unit 12, as part of the initialization processing.

1-5-4. Initialization Processing Procedures

Figure 12:
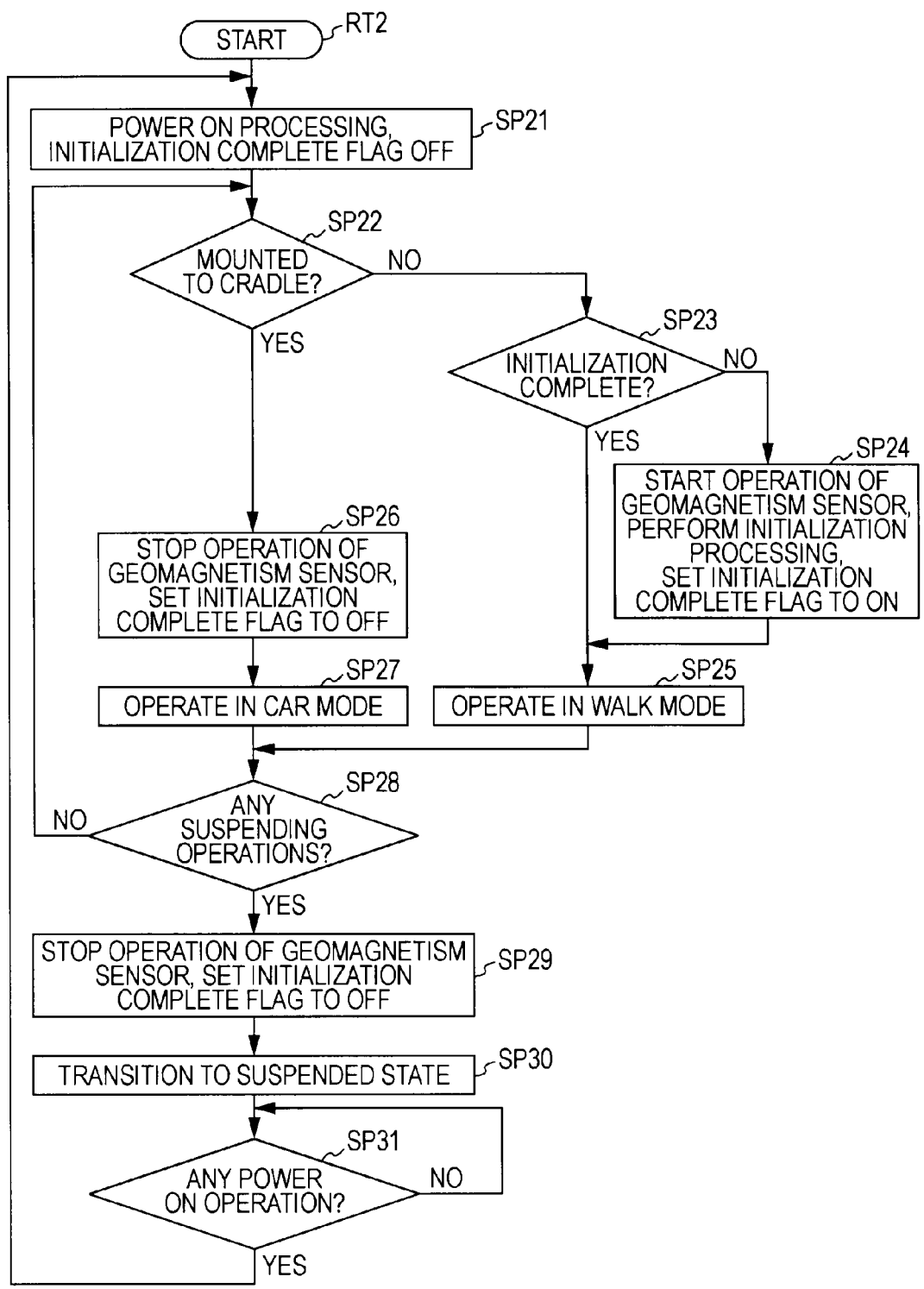
FIG. 12 is a flowchart to accompany description of initializing processing procedures.

Next, initialization processing procedures for the control unit 11 of the PND 1 to perform initialization processing will be described with reference to the flowchart in FIG. 12.

In actual practice, the control unit 11 enters from the starting step of a routine RT2 and advances to step SP21. In step SP21 the control unit 11 switches the entire PND 1 to the power-on state with the operating state switchover unit 16 and starts operations of the display unit 2 and so forth, and further switches off an initialization complete flag which represents whether or not initialization of the learning values LN and learning levels LL have been performed, and advances to the following step SP22.

In step SP22 the control 11 determines whether or not the PND 1 is attached to the cradle 3. If a negative result is obtained here, this indicates that the PND 1 has been taken out of the vehicle 9 and can generate the orientation data CD, and the control unit advances to the following step SP23.

In step SP23 the control unit 11 determines whether or not the initialization processing has been completed, based on the initialization complete flag. If a negative result is obtained here, this indicates that initialization processing has not yet been performed, and the control unit 11 advances to the following step SP24.

In step SP24 the control unit 11 starts the operations of the geomagnetism sensor 8, attitude angle detecting unit 27, and orientation calculation unit 28 with the operating state switchover unit 16, and also performs initialization processing of the learning values LN and learning levels LL with the orientation calculation unit 28. Further, upon switching the initialization complete flag to on, the control unit 11 advances to the following step SP25.

That is to say, in the case that the state has been switched from the suspended state to the power-on state, and the initialization processing has not been performed, the control unit 11 executes the initialization processing of the learning values LN and learning levels LL in step S24.

On the other hand, if a positive result is obtained in step SP23, this indicates that the initialization processing does not have to be performed, and the control unit 11 advances to the following step SP25.

In step SP25 the control unit 11 is switched to walk mode by the operating state switchover unit 16, after which generating a map image with the navigation unit 26 based on the current position data NPD 1 and orientation data CD and the like and performs navigation processing to display this on the display unit 2, and advances to the following step SP28.

On the other hand, if a positive result is obtained in step SP22, this indicates that the PND 1 is inside the vehicle 9, whereby orientation data CD indicating the correct orientation is not generated, and the control unit 11 advances to the following step SP26.

In step SP26 the control unit 11 stops the operations of the geomagnetism sensor 8, attitude angle detecting unit 27, and orientation calculation unit 28 with the operating state switchover unit 16, and switches off the initialization complete flag, and advances to the following step SP27.

Incidentally, in the case that the operations of the geomagnetism sensor 8, attitude angle detecting unit 27, and orientation calculation unit 28 are already stopped, or in the case that the initialization complete flag is already off, the control unit 11 maintains the state thereof without change.

In step SP27 the control unit 11 is switched to vehicle-mounted mode by the operating state switchover unit 16, performs various types of processing such as the map display processing and the like by the position calculation processing procedures RT1 (FIG. 11), and advances to the following step SP28.

In step SP28 the control unit 11 determines whether or not shifting operations to the suspended state have been performed by the user via the power switch of the operating unit 13. If a negative result is obtained here, this indicates that the power-on state is to be continued, and the control unit 11 returns again to step SP22 and continues the navigation processing in the various operating modes.

On the other hand, if a positive result is obtained in step SP28, this indicates shifting to the suspended state, and the control unit 11 advances to the following step SP29.

In step SP29 the control unit 11 stops the operations of the geomagnetism sensor 8, attitude angle detecting unit 27, and orientation calculation unit 28 with the operating state switchover unit 16, and switches off the initialization complete flag, and advances to the following step SP30.

In step SP30 the control unit 11 stops a portion of the functions within the various types of sensors such as the triaxial acceleration sensor 4 and the control unit 11 with the operating state switchover unit 16, thereby shifting to the suspended state, and advances to the following step SP31.

In step SP31 the control unit 11 determines whether or not the power has been turned on via the power-on switch of the operating unit 13. If a negative result is obtained here, the control unit 11 repeats step SP31 until the power-on operation is performed, thereby continuing the suspended state.

On the other hand, if a positive result is obtained in step SP31, this indicates that the PND 1 is to be switched from the suspended state to the power-on state according to the operating instructions by the user, and the control unit 11 returns again to step SP21 and repeats the series of processing.

Incidentally, in the case that a power-off operation is performed by the user via the power switch on the operating unit 13, the control unit 11 switches the entire PND 1 to the power-off state with the operating state switchover unit 16, and ends the series of initialization processing procedures RT2.

1-6. Operations and Effects

With the above configuration, the control unit 11 performs correction processing and the like using correction values of the learning values LN with the orientation calculation unit 28, based on the geomagnetism data TMD obtained from the geomagnetism sensor 8.

Also, the orientation calculation unit 28 manages the degree of learning in the learning values LN as learning levels LL, and limits the modification range of the learning values LN according to the learning level LL.

In the event of being switched from the suspended state to the power-on state, the PND 1 starts the operations of the geomagnetism sensor 8, attitude angle detecting unit 27, and orientation calculation unit 28 with the operating state switchover unit 16, and performs initialization processing of the learning values LN and learning levels LL with the orientation calculation unit 28.

Thus, even in the case that the peripheral magnetic field widely differs compares to immediately prior to the shift to the suspended state, or in the case that the magnetism in metallic parts or the like in the PND 1 has changed during the suspended time, the PND 1 can accurately return the learning value LN and learning level LL to the first value.

Therefore, a learning value LN, which is not an appropriate correction value matching the state of the current magnetic field or the magnetism after change, can be generated, and the learning level LL thereof can also be set appropriately.

Also, in the event of being switched from the suspended state to the power-on state, if the PND 1 is not attached to the cradle 3, initialization processing is performed unconditionally. Therefore, even in the case that the change to peripheral magnetic field or magnetism is a small amount, and determining whether there is any error is difficult from the values of the actually obtained geomagnetism data TMD, the PND 1 can generate learning values LN made up of correction values that enable correction the error herein.

Also, the PND 1 does not generate orientation data CD indicating the correct orientation when inside the vehicle 9, whereby the geomagnetism sensor 8 is not operated. Therefore, in the case of the PND 1 being attached to the cradle 3, i.e., in the case of being installed in the vehicle 9, even if switched from the suspended state to the power-on state, initialization processing is not performed, whereby a useless processing load does not occur in the control unit 11.

According to the above-described configuration, in the event that the control unit 11 of the PND 1 is switched from the suspended state to the power-on state, initialization processing is performed with the orientation calculation unit 28 for the learning values LN that include the correction values to correct the geomagnetism data TMD obtained from the geomagnetism sensor 8 and the learning levels LL that limits the modification range thereof. Thus, even in the case that the peripheral magnetic field differs greatly as compared to immediately prior to shifting to the suspended state, or in the case that the magnetism changes in the metallic parts and the like within the PND 1 during the suspended time, the orientation calculation unit 28 can accurately return the learning values LN and learning level LL to the first values, and re-learn from the beginning.

2. Second Embodiment

Figure 13:
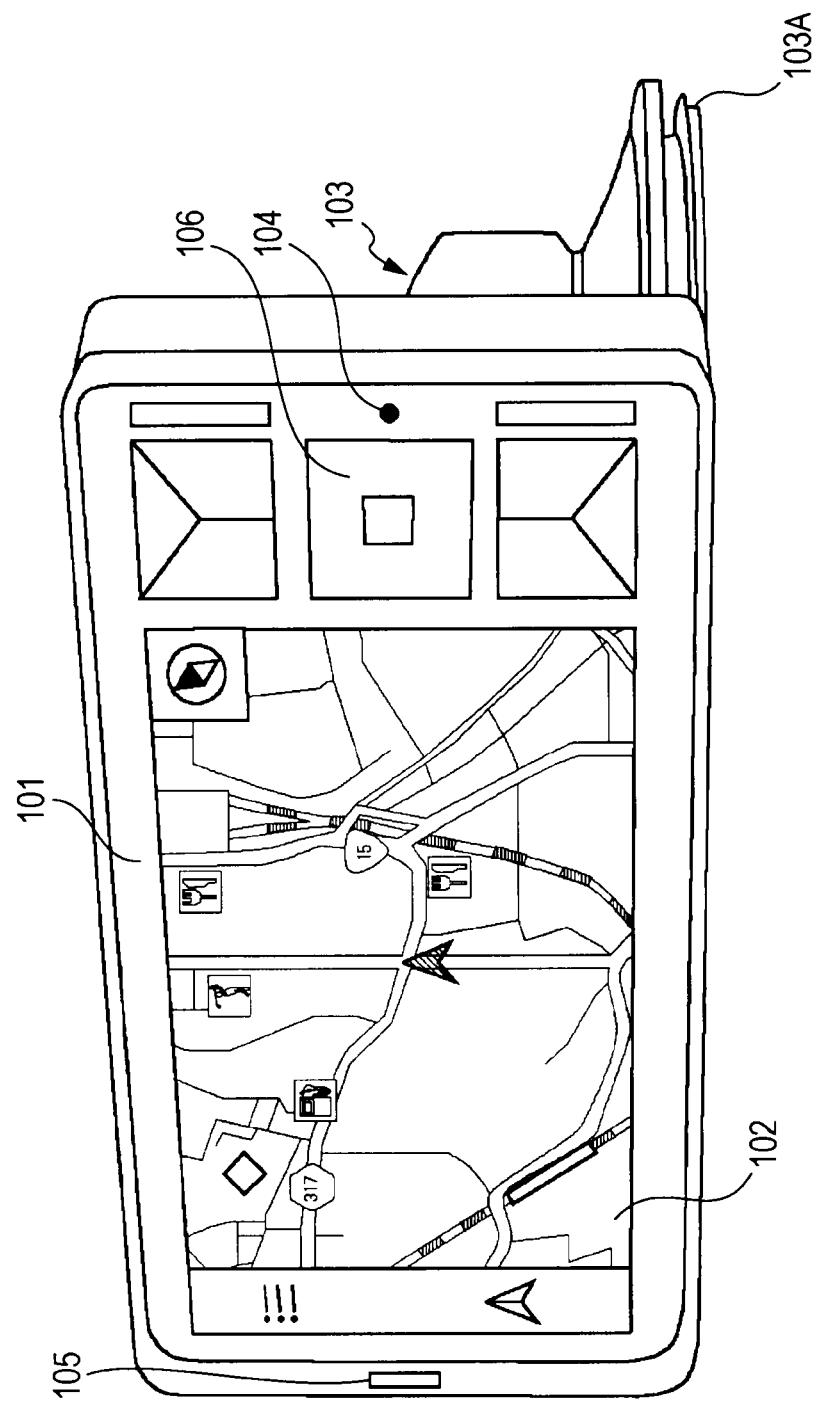
FIG. 13 is a schematic diagram illustrating an overall configuration of a cellular phone.

A cellular phone 101 according to a second embodiment has a display unit 102 that is made up of an LCD (Liquid Crystal Device) to perform various types of displays, a microphone 104, speaker 105, and an operating unit 106 made up of an input button or the like, as shown in FIG. 13.

Also, similar to the PND 1 of the first embodiment, the cellular phone 101 is made to be attachable to the vehicle 9 (FIG. 4) via a cradle 103.

Figure 14:
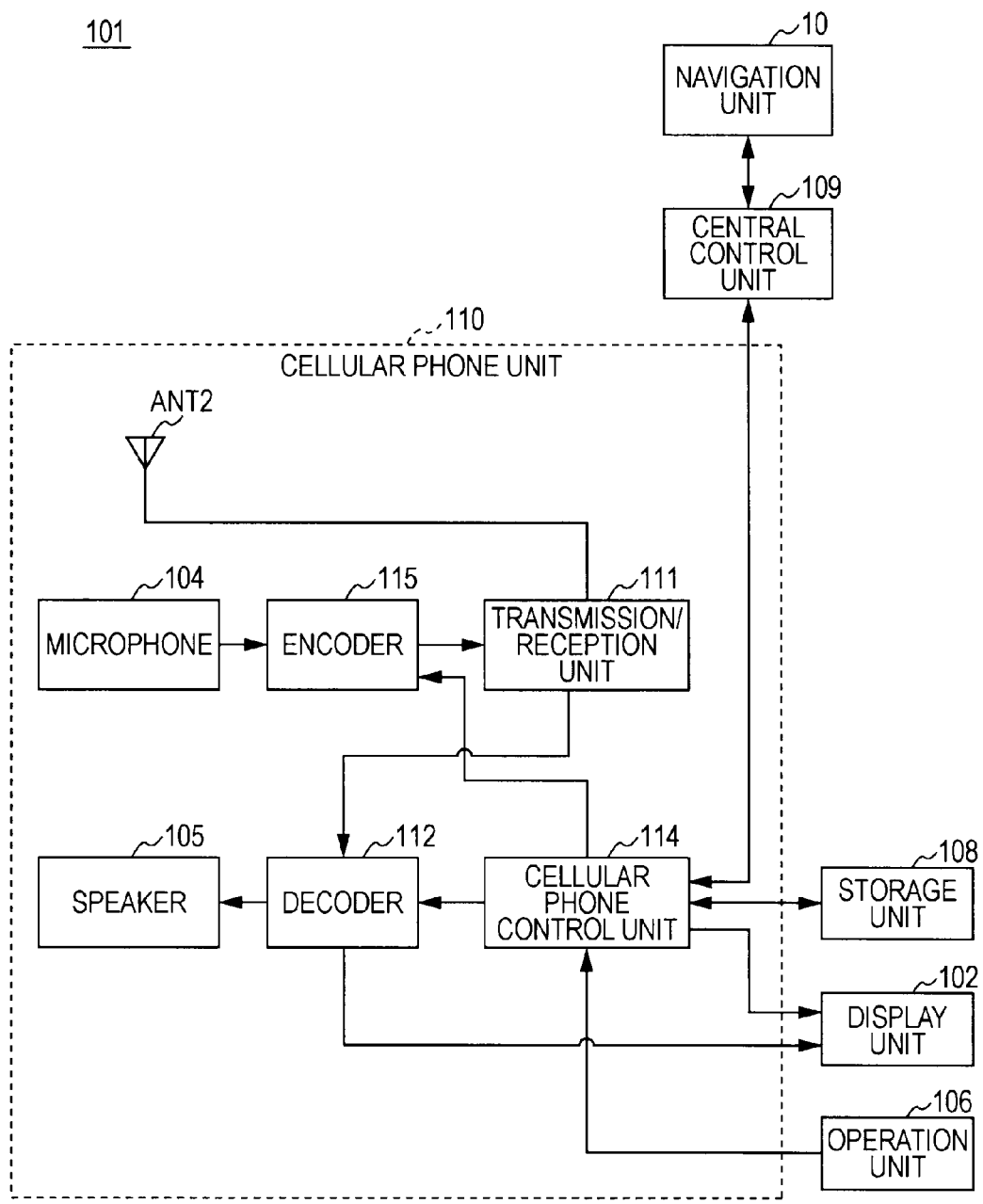
FIG. 14 is a schematic diagram illustrating a circuit configuration of a cellular phone.

As shown in FIG. 14, with the cellular phone 101, a central control unit 109 controls a cellular phone unit 110 serving the function as a cellular phone, and a navigation unit 10 which performs navigation processing similar to that in the above-described first embodiment.

The cellular phone unit 110 is connected to the display unit 102 and the operating unit 106, and also to a storage unit 108 which is made up of a semiconductor memory or the like and is used for saving various types of data. Incidentally, although omitted from FIG. 14, the display unit 102, operating unit 106, and storage unit 108 are also each connected to the navigation unit 10.

In the case of executing a telephone call communication function, the cellular phone 101 uses the cellular phone unit 110 to realize communication functions and email functions. In actual practice, the cellular phone unit 110 of the cellular phone 101 transmits the reception signals received from an unshown base station via an antenna ANT2 to a transmission/reception unit 111.

The transmission/reception unit 111 is made up of a transmission unit and a reception unit, and exchanges reception data by demodulating or the like of the reception signals according to a predetermined method, and transmits this to a decoder 112. The decoder 112 decodes the reception data according to control by the cellular phone control unit 114 made in a microcomputer configuration, thereby restoring the telephone call audio data of the other party of the call, and outputs this to the speaker 105. The speaker 105 outputs the telephone call audio of the partners, based on the telephone call audio data.

On the other hand, the cellular phone unit 110 transmits the audio signals collected from the microphone 104 to an encoder 115. The encoder 115 digitally converts the audio signal according to control by the cellular phone control unit 114, and subsequently transmits the audio data obtained by encoding this with a predetermined method to the transmission/reception unit 111.

Upon demodulating the audio data according to a predetermined method, the transmission/reception unit 111 is wirelessly transmits the data to a base station (unshown) via the antenna ANT2.

At this time the cellular phone control unit 114 of the cellular phone unit 110 displays the telephone number and wave reception state and so forth of the partner on the display unit 102, according to operating commands from the operating unit 106.

Also, in the case of receiving email with the communication function, the cellular phone control unit 114 of the cellular phone unit 110 supplies the reception data from the transmission/reception unit 111 to the decoder 112, transmits the email data restored by decoding the reception data on the display unit 102, and displays the email content on the display unit 102, and stores this on the storage unit 108.

Further, in the case of transmitting email with the communication function, upon encoding the email data input via the operating unit 106 by the encoder 115, the cellular phone control unit 114 of the cellular phone unit 110 wireless transmits this via the transmission/reception unit 111 and antenna ANT2.

On the other hand, in the case of executing the navigation function, the overall control unit 109 controls the navigation unit 10, and executes navigation processing in vehicle-mounted mode or walk mode, according to the attached state to the cradle 103.

The overall control unit 109 restricts power supply to the navigation unit 10 and suppresses power consumption, except when executing the navigation function.

Now, the overall control unit 109 of the cellular phone 101 has a multi-tasking function to switch and execute multiple processes (tasks).

For example, in the case that a phone call is received while executing the navigation function and during navigation processing, the overall control unit 109 temporarily switches to the telephone call function, and after the telephone call processing by the telephone call function has ended, the navigation processing by the navigation function is restarted again.

At this time, while the telephone call function is being temporarily executed, the overall control unit 109 shifts the navigation unit 10 into a suspended state, and suppresses wasteful power consumption.

Now, in the case of executing the navigation function in walk mode, the cellular phone 101 generates the geomagnetism data TMD and supplies this to the orientation calculation unit 28 with the geomagnetism sensor 8 (FIG. 7) of the navigation unit 10, similar to the PND 1 of the first embodiment.

The orientation calculation unit 28 uses the correction values of the learning values LN to correct the geomagnetism data TMD, and generates orientation data CD based on the geomagnetism data TMD and attitude angle data AAD.

Also, similar to the first embodiment, the orientation calculation unit 28 manages the degree of learning of the learning values LN as learning levels LL, and limits the modification range of the learning values LN according to the learning level LL.

Further, the cellular phone 101 shifts the navigation unit 10 to a suspended state with the multitask function, and subsequently when this is returned, similar to when returned from the suspended state to the power-on state according to the first embodiment, initialization processing to return the learning values LN and learning levels LL to the first value is executed with the orientation calculation unit 28.

Thus, similar to the first embodiment, even if there are differences in the peripheral magnetic field when the navigation function is reopened, or if there are changes in magnetism in the metallic parts or the like in the cellular phone 101 during the suspended state, the navigation unit 10 can remove the influences thereof and generate appropriate learning values LN, and can appropriately correct the geomagnetism data TMD.

With the above configuration, in the event that the navigation unit 10 is returned from the suspended state with the multitask function, the cellular phone 101 starts the operations of the geomagnetism sensor 8, attitude angle detecting unit 27, and orientation calculation unit 28 with the operating state switchover unit 16, and performs initialization processing of the learning values LN and learning levels LL with the orientation calculation unit 28.

Thus, even in the case that the peripheral magnetic field widely differs compares to immediately prior to the shift to the suspended state, or in the case that the magnetism in metallic parts or the like in the cellular phone 101 has changed during the suspended time, the cellular phone 101 can accurately return the learning value LN and learning level LL to the first value.

Therefore, the cellular phone 101 can generate a learning value LN, which is not an appropriate correction value matching the state of the current magnetic field or the magnetism after change, and the learning level LL thereof can also be set appropriately.

Also, the cellular phone 101 can obtain the same advantages as the PND 1 as the first embodiment, also for the other points thereof.

According to the above-described configuration, in the event that the navigation unit 10 is returned from the suspended state, the cellular phone 101 according to the second embodiment performs initialization processing with the orientation calculation unit 28 for the learning values LN which include the correction values to correct the geomagnetism data TMD obtained from the geomagnetism sensor 8 and the learning levels LL that limit the modification range thereof. Thus, even in the case that the peripheral magnetic field differs greatly as compared to immediately prior to shifting to the suspended state, or in the case that the magnetism changes in the metallic parts and the like within the cellular phone 101 during the suspended time, the orientation calculation unit 28 can accurately return the learning values LN and learning level LL to the first values, and re-learn from the beginning.

3. Other Embodiments

Note that description has been given wherein, according to the above-described first embodiment, in the event that the PND 1 is returned from the suspended state to the power-on state, in the case that the PND 1 is attached to the cradle 3, initialization processing is not performed.

However, the present invention is not restricted to this, and may be arranged so as to unconditionally perform initialization processing in the event of returning the PND 1 from the suspended state to the power-on state, without detecting the attached state to the cradle 3, for example. In this case, an arrangement may be made wherein initialization processing is not performed with receiving a predetermined cancel operation from a user in the event that a message such as "move the main unit in a figure-8 motion" is displayed on the display unit 2, for example. This is the same with the second embodiment.

Also, description has been given wherein, according to the above-described embodiment, even in the case wherein the engine of the vehicle 9 is started and power supply is started in the state of being attached to the cradle 3, the PND 1 is returned from the suspended state to the power-on state.

However, the present invention is not restricted to this, and may be arranged such that, even in the case wherein the engine of the vehicle 9 is started and power supply is started in the state of being attached to the cradle 3, the suspended state is maintained. This is the same with the second embodiment.

Further, according to the above-described first embodiment, description has been given wherein the degree of updates of the learning values LN, i.e. the degree learning, is managed as learning levels LL, and the modification range of the learning values LN is limited according to the learning level LL.

However, the present invention is not restricted to this, and may be arranged such that learning levels LL are not particularly provided and the learning values LN can be freely modified, or the modification range of learning values LN is limited according to other optional parameters, or further can be modified within a fixed modification range. This is the same with the second embodiment.

Further, according to the above-described first embodiment, description has been given wherein geomagnetism data TMD for a fixed time period in the past (e.g. 30 seconds) is stored in the storage unit 12, and the learning values LN are updated using the past geomagnetism data TMD.

However, the present invention is not restricted to this, and may be arranged such that the geomagnetism data TMD for an optional time period in the past is stored in the storage unit 12, and the learning values LN are updated using the past geomagnetism data TMD, or the newest geomagnetism data TMD can be used to update the learning values LN without storing the past geomagnetism data TMD. Further, the learning values LN can be updated based on other optional parameters. This is the same with the second embodiment.

Further, according to the above-described first embodiment, description has been given wherein, in the initialization processing after shifting from the suspended state to the power-on state, the past geomagnetism data TMD stored in the storage unit 12 is deleted.

However, the present invention is not restricted to this, and may be arranged such that, for example the past geomagnetism data TMD stored in the storage unit 12 immediately prior to shifting to the suspended state can be deleted. Also, for example, a portion or all of the past geomagnetism data TMD remains at the time of initializing processing, and weighting as to the past geomagnetism data TMD is reduced and used.

Figure 15:
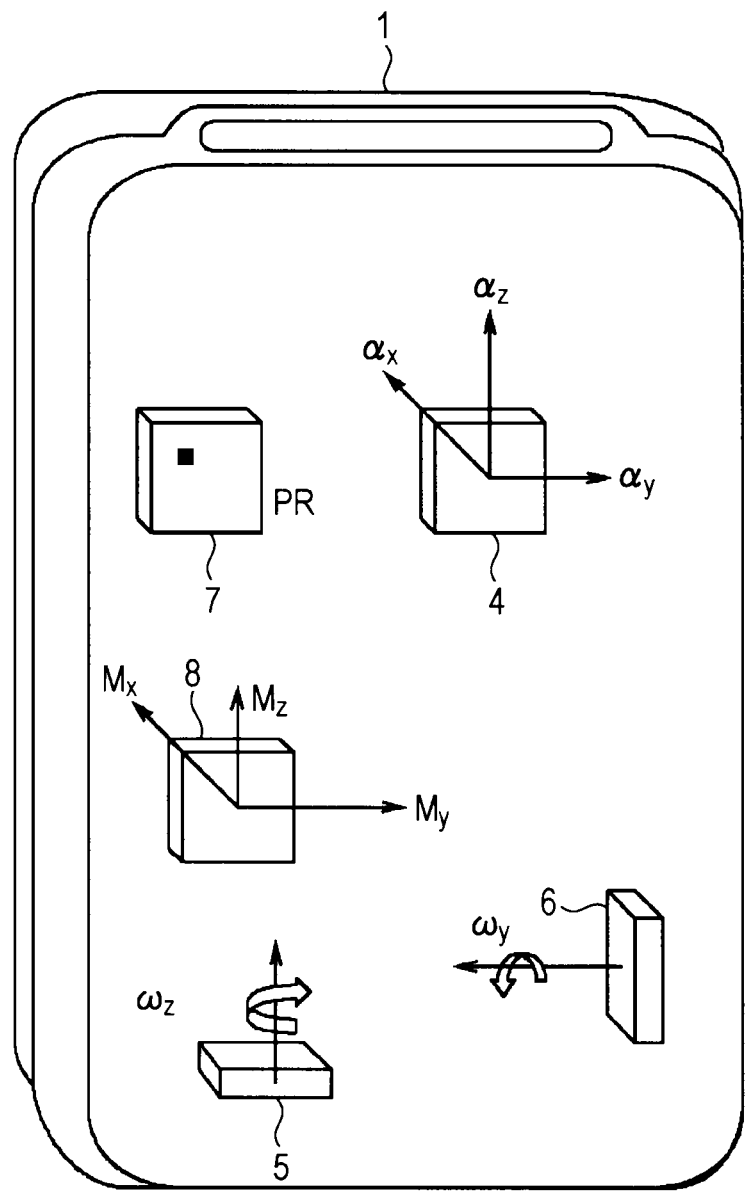
FIG. 15 is a schematic diagram illustrating a usage example according to another embodiment.

Further, according to the above-described first embodiment, description has been given for a case wherein the PND 1 is used in a state of being placed sideways to be long in the left/right direction. However, the present invention is not restricted to this, and may be arranged such that the PND 1 is used in the state that of being placed vertically to be long in the vertical direction, as shown in FIG. 15. In this case the PND 1 detects the yaw rate $\omega_z$ around the Z-axis with the Y-axis gyro sensor 5, and detects the pitch rate $\omega_y$ around the Y-axis with the Z-axis gyro sensor 6. This is the same with the second embodiment.

Further, according to the above-described first embodiment, description has been given for a case wherein a triaxial acceleration sensor 4, Y-axis gyro sensor 5, Z-axis gyro sensor 6, air pressure sensor 7, and geomagnetism sensor 8 are provided within the PND 1. However, the present invention is not restricted to this, and may be arranged such that the triaxial acceleration sensor 4, Y-axis gyro sensor 5, Z-axis gyro sensor 6, air pressure sensor 7, and geomagnetism sensor 8 are provided external to the PND 1. This is the same with the second embodiment.

Also, the PND1 can provide an adjusting mechanism on the side face of the PND 1, for example, so as to enable adjustments to the attaching angle of the triaxial acceleration sensor 4, Y-axis gyro sensor 5, Z-axis gyro sensor 6, air pressure sensor 7, and geomagnetism sensor 8.

Thus, even in a case wherein the PND 1 is not installed so that the display unit 2 thereof is approximately vertically as to the advancing direction of the vehicle 9, by the user adjusting the adjustment mechanism, for example the rotation axis of the Y-axis gyro sensor 5 can be matched to the vertical direction of the vehicle 9. This is the same with the second embodiment.

Further, according to the above-described first embodiment, description has been given for a case wherein the PND 1 is attached to a vehicle 9 which is an automobile, but the present invention is not restricted to this, and the PND 1 can be attached to various moving objects that move along various movement surfaces, such as a motorcycle, bicycle, or train. In this case, for example the cradle 3 may be fixed to the handlebar or the like of the moving object via a predetermined attachment or the like.

Further, according to the above-described second embodiment, description has been given for a case wherein the present invention is applied to a navigation unit 10 of a cellular phone 101. However, the present invention is not restricted to this application, and for example, the present invention may be applied to various types of electronic devices having a navigation function and electronic compass function, such as a computer device or digital camera or the like, for example.

Further, according to the above-described first embodiment, description has been given for a case wherein the control unit 11 of the PND 1 performs initialization processing procedures for the above-described routine RT2, according to an application program stored beforehand in the storage unit 12. However, the present invention is not restricted to this, and the control unit 11 of the PND 1 can perform the above-described initialization processing procedures according to application programs installed from a storage medium, application programs downloaded from the Internet, and application programs installed by other various routes. This is the same with the second embodiment.

Further, according to the above-described first embodiment, description has been given for a case wherein the PND 1 is configured as a navigation device with a GPS processing unit 21 or position calculation unit 25 serving as a measuring unit, a geomagnetism sensor 8 serving as a geomagnetism sensor, an orientation calculation unit 28 serving as an orientation calculation unit, a display unit 2 serving as a presenting unit, an operating state switchover unit 16 serving as an operating state switchover unit, and an orientation calculation unit 28 serving as an initialization processing unit.

However, the present invention is not restricted to this, and the navigation device may be made up of a measuring unit, geomagnetism sensor, orientation calculation unit, presenting unit, operating state switchover unit, and initialization processing unit made with various other configurations.

Further, according to the above-described second embodiment, description has been given for a case wherein the cellular phone 101 serving as a cellular phone with navigation function is made up of a GPS processing unit 21 or position calculation unit 25 serving as a measuring unit, a geomagnetism sensor 8 serving as a geomagnetism sensor, an orientation calculation unit 28 serving as an orientation calculation unit, a display unit 2 serving as a presenting unit, an operating state switchover unit 16 serving as an operating state switchover unit, an orientation calculation unit 28 serving as an initialization processing unit, and a cellular phone unit 110 serving as a cellular phone.

However, the present invention is not restricted to this, and the cellular phone with navigation function may be made up of a measuring unit, geomagnetism sensor, orientation calculation unit, presenting unit, operating state switchover unit, initialization processing unit, and cellular phone unit made with various other configurations.

The present application contains subject matter related to that disclosed in Japanese Priority Patent Application JP 2009-216081 filed in the Japan Patent Office on Sep. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A navigation device comprising:
a measuring unit to measure a current position of the navigation device;
a geomagnetism sensor provided on a predetermined main unit and that detects geomagnetism of a surrounding environment in which the navigation device is located;
an orientation calculation unit that calculates an orientation of said main unit, upon setting correction values for correcting detection values of said geomagnetism sensor, based on said detection values and said correction values;
a presenting unit that presents measurement results from said measuring unit and the calculation results of said orientation calculation unit to a user;
an operating state switchover unit that switches between a normal operating state that executes said presenting processing and a suspended state that maintains a portion of a processing state while stopping at least the calculation processing of said orientation calculation unit;
an initialization processing unit that initializes said correction values, upon having switched from said suspended state to said normal operating state by said operating state switchover unit; and
a correction value updating unit that updates said correction values based on detection results of said geomagnetism sensor, and that updates a correction level representing a degree of updates to said correction values,
wherein said initialization processing unit initializes said correction level in addition to said correction values upon having switched from said suspended state to said normal operating state by said operating state switchover unit.

2. The navigation device according to claim 1, further comprising:
an attached state detecting unit that detects whether or not said main unit is attached to a predetermined base portion;
wherein the initialization processing unit initializes said correction values upon having switched from said suspended state to said normal operating state by said operating state switchover unit, and said main unit is not attached to said base portion.

3. The navigation device according to claim 2,
wherein said base portion is attached to a predetermined moving object and supplies power that is supplied from the moving object to said main unit;
and wherein said operating state switchover unit switches to said normal operating state when supplying of said power is started from said moving object, with said main unit still attached to said base portion in said suspended state.

4. The navigation device according to claim 1,
wherein said orientation calculation unit stores a portion of past detection values, and calculates the orientation of said main unit based on said stored past detection in addition to said correction values and said detection values;

and wherein said initialization processing unit initializes said correction values and deletes said past detection values stored upon having switched from said suspended state to said normal operating state by said operating state switchover unit.

5. A correction value initialization method comprising the steps of:
- measuring, with a predetermined measuring unit, a current position of a navigation device;
- detecting, with a geomagnetism sensor that is provided on a predetermined main unit, geomagnetism of a surrounding environment in which the navigation device is located;
- calculating, with a predetermined orientation calculation unit, an orientation of said main unit upon setting correction values for correcting detection values of said geomagnetism sensor beforehand, based on said detection values and said correction values;
- presenting measurement results from a measuring unit and the calculation results of said orientation calculation unit to a user with a predetermined presenting unit;
- switching, with a predetermined operating state switchover unit, between a normal operating state that executes said presenting processing and a suspended state that maintains a portion of a processing state while stopping at least the calculation processing of said orientation calculation unit, with a predetermined operating state switchover unit;
- initializing correction values by a predetermined initialization processing unit upon having switched from said suspended state to said normal operating state by said operating state switchover unit; and
- updating, with a correction value updating unit, said correction values based on detection results of said geomagnetism sensor;
- updating, with said correction value updating unit, a correction level representing a degree of updates to said correction values,
  - wherein said initialization step includes initializing said correction level in addition to said correction values upon having switched from said suspended state to said normal operating state by said operating state switchover unit.

6. A cellular phone having navigation functionality, comprising:
- a measuring unit that measures a current position of the cellular phone;
- a geomagnetism sensor that is provided on a predetermined main unit, and that detects geomagnetism of a surrounding environment in which the cellular phone is located;
- an orientation calculation unit that calculates an orientation of said main unit upon setting correction values for correcting detection values of said geomagnetism sensor based on said detection values and said correction values;
- a presenting unit that presents measurement results by said measuring unit and the calculation results of said orientation calculation unit to a user;
- an operating state switchover unit that switches between a normal operating state that executes said presenting processing and a suspended state that maintains a portion of processing state while stopping at least the calculation processing of said orientation calculation unit;
- an initialization processing unit that initializes said correction values upon having switched from said suspended state to said normal operating state by said operating state switchover unit;
- a cellular phone unit that performs telephone call processing by performing wireless communication with a predetermined base station; and
- a correction value updating unit that updates said correction values based on detection results of said geomagnetism sensor, and that updates a correction level representing a degree of updates to said correction values;
- wherein said initialization processing unit initializes said correction level in addition to said correction values, upon having switched from said suspended state to said normal operating state by said operating state switchover unit.

* * * * *